United States Patent
Araki et al.

(10) Patent No.: US 7,670,640 B2
(45) Date of Patent: Mar. 2, 2010

(54) CURABLE FLUORINE-CONTAINING POLYMER, CURABLE RESIN COMPOSITION PREPARED FROM SAME AND ANTIREFLECTION FILM

(75) Inventors: Takayuki Araki, Settsu (JP); Mihoko Ohashi, Settsu (JP); Yoshito Tanaka, Settsu (JP); Tetsuo Shimizu, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 1106 days.

(21) Appl. No.: 11/226,355

(22) Filed: Sep. 15, 2005

(65) Prior Publication Data

US 2006/0008652 A1    Jan. 12, 2006

Related U.S. Application Data

(63) Continuation of application No. 10/362,719, filed as application No. PCT/JP01/07344 on Aug. 28, 2001, now abandoned.

(30) Foreign Application Priority Data

| Aug. 29, 2000 | (JP) | ................................ 2000-259583 |
| Oct. 3, 2000 | (JP) | ................................ 2000-303723 |
| Mar. 14, 2001 | (JP) | ................................ 2001-73025 |

(51) Int. Cl.
 *B05D 5/06* (2006.01)
(52) U.S. Cl. .................... 427/162; 427/384; 427/385.5
(58) Field of Classification Search .................. None
 See application file for complete search history.

(56) References Cited

U.S. PATENT DOCUMENTS

| 4,474,899 | A | | 10/1984 | Resnick |
| 4,751,114 | A | * | 6/1988 | Homma et al. ............ 427/407.1 |
| 5,846,650 | A | * | 12/1998 | Ko et al. .................... 428/336 |
| 6,254,973 | B1 | | 7/2001 | Yoshida et al. |
| 6,271,326 | B1 | * | 8/2001 | Nishikawa et al. .......... 526/242 |
| 6,383,559 | B1 | * | 5/2002 | Nakamura et al. .......... 427/180 |

FOREIGN PATENT DOCUMENTS

| EP | 820980 A1 | 1/1998 |
| EP | 1 059 308 A | 12/2000 |
| JP | 2-233748 A | 9/1990 |
| JP | 5-230151 | 9/1993 |
| JP | 6-248026 | 9/1994 |
| JP | 7-126552 | 5/1995 |

OTHER PUBLICATIONS

International Search Report for PCT/JP01/07344 dated Dec. 11, 2001.
English translation of International Preliminary Examination Report for PCT/JP01/07344 dated Jul. 2, 2002.
Supplementary European Search Report for EP 01 95 8540 dated Jul. 21, 2003.

* cited by examiner

*Primary Examiner*—Erma Cameron
(74) *Attorney, Agent, or Firm*—Sughrue Mion, PLLC

(57) ABSTRACT

There are provided a curable fluorine-containing polymer which can realize a high hardness by photo-curing while maintaining a low refractive index, an antireflection film possessing improved scratch resistance and abrasion resistance while maintaining a reflection reducing effect, and an antireflection-treated article provided with such an antireflection film. The curable fluorine-containing polymer has a number average molecular weight of from 500 to 1,000,000 and is represented by the formula (1):

$$\text{—(A)—(M)—}\qquad(1)$$

in which the structural unit M is a structural unit derived from a fluorine-containing ethylenic monomer and represented by the formula (M):

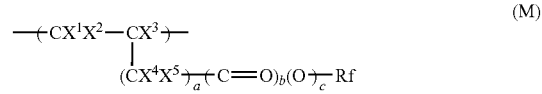

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1, the structural unit A is a structural unit derived from a monomer copolymerizable with the fluorine-containing ethylenic monomer represented by the formula (M), and the structural unit M and the structural unit A are contained in amounts of from 0.1 to 100% by mole and from 0 to 99.9% by mole, respectively.

15 Claims, No Drawings

CURABLE FLUORINE-CONTAINING POLYMER, CURABLE RESIN COMPOSITION PREPARED FROM SAME AND ANTIREFLECTION FILM

CROSS-REFERENCES TO RELATED APPLICATIONS

This application is a Continuation of U.S. application Ser. No. 10/362,719 filed Feb. 26, 2003, now abandoned, which is a 371 of PCT Application No. PCT/JP01/07344 filed Aug. 28, 2001; the above-noted applications incorporated herein by reference in their entirety.

TECHNICAL FIELD

The present invention relates to a novel curable fluorine-containing polymer, a curable resin composition prepared from same and a cured article and cured film obtained by curing the curable fluorine-containing polymer and also relates to an antireflection film obtained from the cured film and an antireflection-treated article provided with the antireflection film.

BACKGROUND ART

As a result of development of multi-media, it has become more important to secure an increased visible area (a property of decreasing surface-reflected area when viewing at an angle, which is also called "visibility") of a display of various displaying devices. A large size displaying device is also required to have well visible display, which is a problem to be solved from technical point of view.

In order to enhance visibility of the displaying device, an antireflection film made of a material having a low refractive index has been formed on a substrate of the displaying device. For forming an antireflection film, there is known, for example, a method of forming a thin film of a fluorine-containing compound by a deposition method. However in the deposition method, it is difficult to form a coating film on a substrate for a large display and yet a cost is high since a vacuum equipment is required.

Such being the case, there have been studied methods of forming an antireflection film by preparing a liquid composition by dissolving a fluorine-containing polymer having a low refractive index in an organic solvent and then coating the obtained composition on a surface of a substrate (for example, JP6-115023A, etc.).

However in the method of coating the fluorine-containing polymer solution, hardness of a coating film is insufficient and therefore the coating film is damaged and peeled off due to abrasion, thereby lowering appearance of a display.

Therefore there have been studied methods of preparing a composition by mixing a photo-curable acrylic monomer, for example, a fluorine-containing acrylic monomer or a fluorine-containing polyfunctional acrylic compound to a fluorine-containing polymer having a low refractive index and after coating the composition, photo-curing the acrylic monomer (JP7-126552A, JP7-188588A, JP8-48935A, etc.).

However in those methods, hardness of the coating film is still insufficient because the fluorine-containing polymer itself which is the main component is not crosslinked. In order to increase the hardness, an amount of the acrylic monomer or the polyfunctional acrylic compound may be increased, but in that case, a refractive index of the cured film is increased and an intended reflection reducing effect is lowered. Also in those methods, the un-reacted acrylic monomer or polyfunctional acrylic compound is apt to remain in the coating film, which causes lowering of physical properties of the cured coating film.

Also methods of mixing a fluorine-containing polymer having a photo-reactive (photo-polymerizable) functional group introduced in its side chain with an acrylic monomer or polyfunctional acrylic compound and photo-curing after coating the mixture have been studied (JP 2527186 and JP 2543903). However the fluorine-containing polymers described therein are high in a refractive index and therefore are insufficient in performance for an antireflection film. In addition, as the number of cure sites of the fluorine-containing polymer is increased to increase hardness, a refractive index becomes high and therefore a reflection reducing effect is further lowered.

An object of the present invention is to provide a curable fluorine-containing polymer which can make its hardness high by photo-curing while maintaining a low refractive index.

Another object of the present invention is to provide an antireflection film possessing improved scratch resistance and abrasion resistance while maintaining a reflection reducing effect and also to provide an antireflection-treated article having such an antireflection film thereon.

DISCLOSURE OF INVENTION

The present inventors have made intensive studies to achieve those objects and have found novel curable fluorine-containing polymers having an ethylenic carbon-carbon double bond in its side chain and have found that when those polymers are used, a cured article having a high hardness can be obtained while maintaining a low refractive index.

Further the present inventors have found that a cured film of a specific fluorine-containing polymer having a carbon-carbon unsaturated bond at an end of its side chain is useful as an antireflection film having both of low reflection and high hardness.

The present inventors have completed the present invention mentioned below based on the above-mentioned findings.

The first of the present invention relates to a curable fluorine-containing polymer having an ethylenic carbon-carbon double bond in its side chain.

The curable fluorine-containing polymer of the present invention has a number average molecular weight of from 500 to 1,000,000 and is represented by the formula (1):

   (1)

in which the structural unit M is a structural unit derived from fluorine-containing ethylenic monomer and represented by the formula (M):

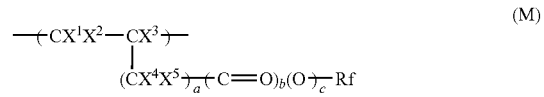

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1, the structural unit A is a structural unit derived from monomer copolymerizable with the fluorine-containing ethylenic monomer represented by the formula (M), and the structural unit M and the structural unit A are contained in amounts of from 0.1 to 100% by mole and from 0 to 99.9% by mole, respectively.

The second of the present invention relates to a process for preparing a curable fluorine-containing polymer having a number average molecular weight of from 500 to 1,000,000 which is characterized by esterifying:

fluorine-containing polymer having hydroxyl and represented by the formula (2)

  (2)

in which the structural unit N is a structural unit having hydroxyl and derived from fluorine-containing ethylenic monomer and is represented by the formula (N):

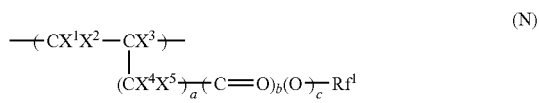  (N)

wherein $X^1$ and $X^2$ are the same or different and each is H or F; $X^3$ is H, F, $CH_3$ or $CF_3$; $X^4$ and $X^5$ are the same or different and each is H, F or $CF_3$; $Rf^1$ is an organic group in which 1 to 3 of $Y^5$ ($Y^5$ is hydroxyl or a monovalent organic group having 1 to 10 carbon atoms and hydroxyl) are bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1, the structural unit (B) is a structural unit derived from monomer copolymerizable with the fluorine-containing ethylenic monomer having hydroxyl which is represented by the above-mentioned formula (N), and the structural unit N and the structural unit B are contained in amounts of from 0.1 to 100% by mole and from 0 to 99.9% by mole, respectively, with an unsaturated carboxylic acid or its derivative having 3 to 10 carbon atoms (a total number of carbon atoms including carbon atoms of $Y^3$ is from 3 to 10) and represented by the formula:

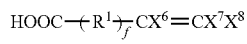

wherein $R^1$ is a divalent organic group which has 1 to 7 carbon atoms and may be substituted with fluorine atom; $X^6$ is H, F, $CH_3$ or $CF_3$; $X^7$ and $X^8$ are the same or different and each is H or F; f is 0 or 1. The obtained curable fluorine-containing polymer is represented by the formula (1a):

  (1a)

in which the structural unit M4 is a structural unit derived from a fluorine-containing ethylenic monomer and represented by the formula (M4):

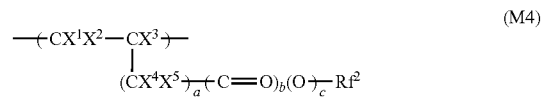  (M4)

wherein $X^1$ and $X^2$ are the same or different and each is H or F; $X^3$ is H, F, $CH_3$ or $CF_3$; $X^4$ and $X^5$ are the same or different and each is H, F or $CF_3$; $Rf^2$ is an organic group in which 1 to 3 of $Y^6$ having 3 to 10 carbon atoms and represented by the formula:

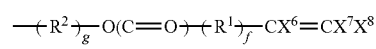

wherein $R^1$, $X^6$, $X^7$, $X^8$ and f are as defined above; $R^2$ is a divalent organic group which has 1 to 7 carbon atoms and may be substituted with fluorine atom; g is 0 or 1, are bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1, the structural unit A is a structural unit derived from monomer copolymerizable with the fluorine-containing ethylenic monomer represented by the formula (M4), and the structural unit M4 and the structural unit A are contained in amounts of from 0.1 to 100% by mole and from 0 to 99.9% by mole, respectively.

The third of the present invention relates to a fluorine-containing resin composition for coating which comprises:
(a) the above-mentioned curable fluorine-containing polymer or any of the curable fluorine-containing polymers of claims 2 to 14,
(b) an active energy curing initiator which initiates curing with active energy, and
(c) a solvent, if necessary, and relates to a cured article obtained therefrom, particularly a photo-cured article and a cured film.

The fourth of the present invention relates to an antireflection film.

The antireflection film is an antireflection film which is a cured film of a fluorine-containing prepolymer, in which the fluorine-containing prepolymer has:
(i) a carbon-carbon unsaturated bond at an end of its side chain, and
(ii) a refractive index of not more than 1.40, and a thickness of the cured film is from 0.03 to 0.5 μm;

an antireflection film which is a cured film obtained by photo-curing a coating film formed by coating a composition for coating which comprises:
(d) the above-mentioned fluorine-containing prepolymer,
(e) an active energy curing initiator which initiates curing with active energy, and
(f) a solvent, in which a thickness of the cured film is from 0.03 to 0.5 μm; or an antireflection film which is a cured film obtained by photo-curing a coating film formed by coating a composition for coating which comprises:

(d) the above-mentioned fluorine-containing prepolymer,
(e) an active energy curing initiator which initiates curing with active energy,
(f) a solvent, and
(g) a curing agent, in which a thickness of the cured film is from 0.03 to 0.5 µm.

The fifth of the present invention relates to an antireflection-treated article obtained by applying the above-mentioned antireflection film on a substrate.

The sixth of the present invention relates to a novel fluorine-containing unsaturated compound. The novel compound is a fluorine-containing unsaturated compound represented by the formula (4-1):

$$CX^1X^2=CX^3-(CX^4X^5)_a-(O)_c-Rf'  \quad (4\text{-}1)$$

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf' is an organic group in which 1 to 3 of $Y^3$ ($Y^3$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond; a is 0 or an integer of from 1 to 3; c is 0 or 1, in which $Y^3$ is an organic group represented by the formula:

$$-(O)_d-(C=O)-Y^4$$

wherein $Y^4$ is an alkenyl group or fluorine-containing alkenyl group having 2 to 5 carbon atoms and an ethylenic carbon-carbon double bond at its end and d is 0 or 1.

BEST MODE FOR CARRYING OUT THE INVENTION

The curable fluorine-containing polymer of the first invention is, as mentioned above, the curable fluorine-containing polymer which has a number average molecular weight of from 500 to 1,000,000 and is represented by the formula (1):

$$-(M)-(A)- \quad (1)$$

in which the structural unit M is a structural unit represented by the formula (M):

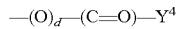

(M)

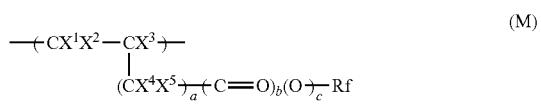

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1, the structural unit A is a structural unit derived from monomer copolymerizable with the fluorine-containing ethylenic monomer represented by the formula (M), and the structural unit M and the structural unit A are contained in amounts of from 0.1 to 100% by mole and from 0 to 99.9% by mole, respectively.

The structural unit M is a structural unit derived from a fluorine-containing ethylenic monomer represented by the formula (3):

$$CX^1X^2=CX^3-(CX^4X^5)_a-(C=O)_b-(O)_c-Rf \quad (3)$$

wherein $X^1$, $X^2$, $X^3$, $X^4$, $X^5$, Rf, a, b and c are as defined in the formula (M).

Namely, the curable fluorine-containing polymer is a homopolymer of the above-mentioned fluorine-containing ethylenic monomer having, in its side chain, an ethylenic carbon-carbon double bond curable by a reaction or a copolymer having the fluorine-containing ethylenic monomer as an essential component.

It is preferable that at least one of $Y^1$ is bonded to an end of Rf.

In the curable fluorine-containing polymer of the formula (1) of the present invention, the structural unit M is preferably a structural unit M1 represented by:

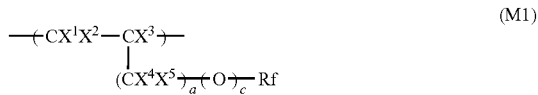

(M1)

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond; a is 0 or an integer of from 1 to 3; c is 0 or 1.

The structural unit M1 is a structural unit derived from a fluorine-containing ethylenic monomer represented by:

$$CX^1X^2=CX^3-(CX^4X^5)_a-(O)_c-Rf \quad (4)$$

wherein $X^1$, $X^2$, $X^3$, $X^4$, $X^5$, Rf, a and c are as defined in the formula (3). Among the fluorine-containing unsaturated compounds represented by the formula (4), the fluorine-containing unsaturated compound represented by the formula (4-1):

$$CX^1X^2=CX^3-(CX^4X^5)_a-(O)_c-Rf' \quad (4\text{-}1)$$

wherein $X^1$, $X^2$, $X^3$, $X^4$, $X^5$, a and c are as defined in the formula (4); Rf' is an organic group in which 1 to 3 of $Y^3$ ($Y^3$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond, in which $Y^3$ is an organic group represented by the formula:

$$-(O)_d-(C=O)-Y^4$$

wherein $Y^4$ is an alkenyl group or fluorine-containing alkenyl group having 2 to 5 carbon atoms and an ethylenic carbon-carbon double bond at its end, d is 0 or 1, is a novel compound which has not been disclosed in any publications.

The polymer containing the above-mentioned structural unit M1 is particularly low in refractive index, and is preferred particularly since a refractive index can be decreased even in the cases of a M1 homopolymer and a polymer containing the M1 in an increased amount.

More preferable example of M1 is a structural unit M2 represented by:

wherein Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond.

The structural unit M2 is a structural unit derived from a fluorine-containing ethylenic monomer represented by the formula (4-2):

$$CH_2=CF-CF_2-O-Rf \qquad (4-2)$$

wherein Rf is as defined in the formula (3). Among the fluorine-containing unsaturated compounds represented by the formula (4-2), a fluorine-containing unsaturated compound represented by the formula (4-3):

$$CH_2=CFCF_2ORf' \qquad (4-3)$$

wherein Rf' is as defined in the formula (4-1), is a novel compound which has not been disclosed in any publications.

Namely, the above-mentioned M2 is a structural unit of a fluorine-containing allyl ether having an ethylenic carbon-carbon double bond at its end and is preferred since not only a refractive index can be decreased but also polymerizability thereof, particularly homopolymerizability and copolymerizability with the fluorine-containing ethylenic monomer are good.

Another example of preferable M1 is a structural unit M3 represented by:

wherein Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond.

The structural unit M3 is a structural unit derived from a fluorine-containing ethylenic monomer represented by the formula (4-4):

$$CF_2=CF-O-Rf \qquad (4-4)$$

wherein Rf is as defined in the formula (3). Among the fluorine-containing unsaturated compounds represented by the formula (4-4), the fluorine-containing unsaturated compound represented by the formula (4-5):

$$CF_2=CFORf' \qquad (4-5)$$

wherein Rf' is as defined in the formula (4-1) is a novel compound which has not been disclosed in any publications.

The above-mentioned M3 is a structural unit of a fluorine-containing vinyl ether having an ethylenic carbon-carbon double bond at its end and is preferred since a refractive index can be decreased and copolymerizability with the fluorine-containing ethylenic monomer is good.

In the curable fluorine-containing polymer of the formula (1) of the present invention, $Y^1$ contained in the structural units M, M1, M2 and M3 is an organic group having 2 to 10 carbon atoms and an ethylenic carbon-carbon double bond at its end.

Namely, the carbon-carbon double bond in $Y^1$ has an ability of causing polycondensation reaction, ring formation reaction and addition reaction, and thereby a cured (crosslinked) article can be obtained. Concretely, for example, by contact of the carbon-carbon double bond with radical or cation, there arise a polymerization reaction and condensation reaction between molecules of the curable fluorine-containing polymer of the present invention or between the curable fluorine-containing polymer and the curing (crosslinking) agent added as case demands, and thus a cured (crosslinked) article can be obtained.

In the curable fluorine-containing polymers of the formulae (1) and (2) of the present invention, preferable $Y^1$ is:

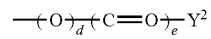

wherein $Y^2$ is an alkenyl group or fluorine-containing alkenyl group having 2 to 5 carbon atoms and an ethylenic carbon-carbon double bond at its end, d and e are the same or different and each is 0 or 1, and preferable $Y^2$ is:

$$-CX^6=CX^7X^8$$

wherein $X^6$ is H, F, $CH_3$ or $CF_3$; $X^7$ and $X^8$ are H or F since curing reactivity thereof by contact with radical or cation is high.

Examples of the preferable $Y^4$ in the novel fluorine-containing unsaturated compounds of the present invention represented by (4-1), (4-3) and (4-5) are the same as the above-mentioned $Y^2$.

Examples of the preferable $Y^2$ and $Y^4$ are:

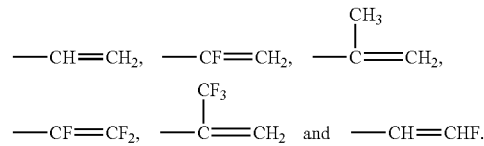

Examples of more preferable $Y^1$ and $Y^3$ are:

$$-O(C=O)CX^6=CX^7X^8$$

wherein $X^6$ is H, F, $CH_3$ or $CF_3$, $X^7$ and $X^8$ are H or F, which are preferred since a curing reactivity by contact with radical is particularly higher and a cured article can be obtained easily by photo-curing, etc.

Examples of the above-mentioned $Y^1$ and $Y^3$ are:

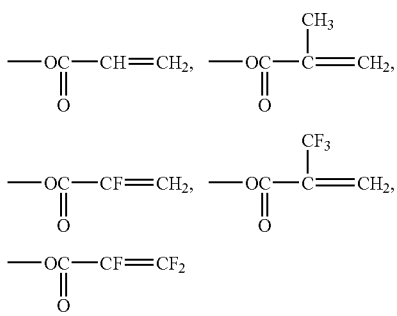

and the like.

Other examples of $Y^1$ are:

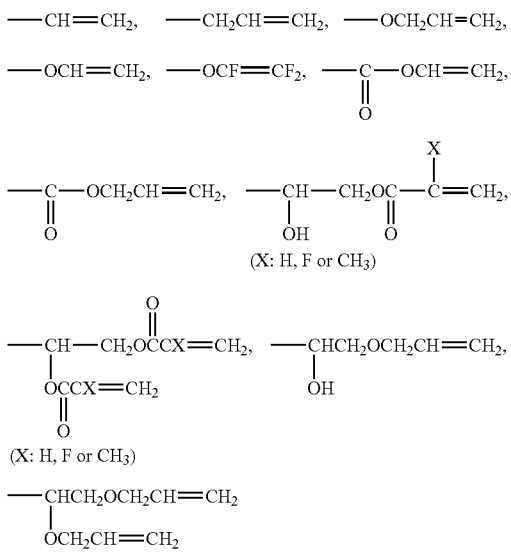

and the like.

Other examples of $Y^3$ are:

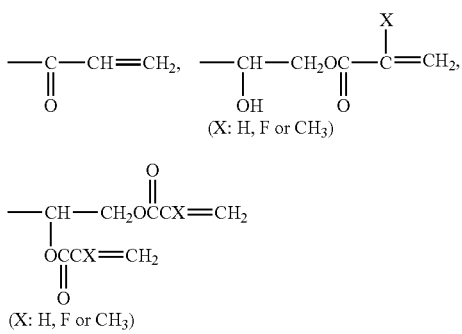

and the like.

Particularly those which have a structure of —O(C=O)CF=CH$_2$ are preferred since a refractive index can be reduced and a curing (crosslinking) reactivity is particularly high, which enables a cured article to be obtained effectively.

In Rf contained in the structural units M, M1, M2 and M3 of the curable fluorine-containing polymer of the formula (1) of the present invention, Rf' contained in the novel fluorine-containing unsaturated compounds represented by the formulae (4-1), (4-3) and (4-5), $Rf^1$ contained in the structural unit N of the fluorine-containing polymer of the formula (2) having hydroxyl and further $Rf^4$ and $Rf^5$ contained in the structural units (A1) and (A2) of the curable fluorine-containing polymer of the formula (1-1), examples of preferable organic groups excluding the functional groups $Y^1, Y^3, Y^5, Z^1$ and $Z^2$ are fluorine-containing alkylene groups having 1 to 40 carbon atoms and fluorine-containing alkylene groups having 2 to 100 carbon atoms and ether bond particularly in case where the number of functional groups $Y^1, Y^3$ or $Y^5$ is one. In those organic groups, fluorine atom is bonded to carbon atom contained therein. Generally those organic groups are fluorine-containing alkylene groups or fluorine-containing alkylene groups having ether bond, in which fluorine atom and hydrogen atom or chlorine atom are bonded to carbon atom. Preferred are those having more fluorine atoms (a higher fluorine content). The fluorine content is not less than 50%, preferably not less than 70% on the basis of a molecular weight of the organic groups provided that oxygen atoms in the organic groups and the functional groups are eliminated from calculation. More preferred are perfluoro alkylene groups or perfluoro alkylene groups having ether bond. Those organic groups are preferred since a refractive index of the curable fluorine-containing polymer can be reduced, particularly since a low refractive index can be maintained even when a curing degree (density of crosslinking) is made high to increase hardness of the cured article.

Too large number of carbon atoms is not preferable because in case of the fluorine-containing alkylene groups, there is a case where solubility in a solvent is lowered and transparency is lowered and in case of the fluorine-containing alkylene groups having ether bond, there is a case where hardness and mechanical properties of the polymer itself and the cured article obtained therefrom are lowered. The number of carbon atoms of the fluorine-containing alkylene groups is preferably from 1 to 20, more preferably from 1 to 10, and the number of carbon atoms of the fluorine-containing alkylene groups having ether bond is preferably from 2 to 30, more preferably from 2 to 20

Preferable example thereof is:

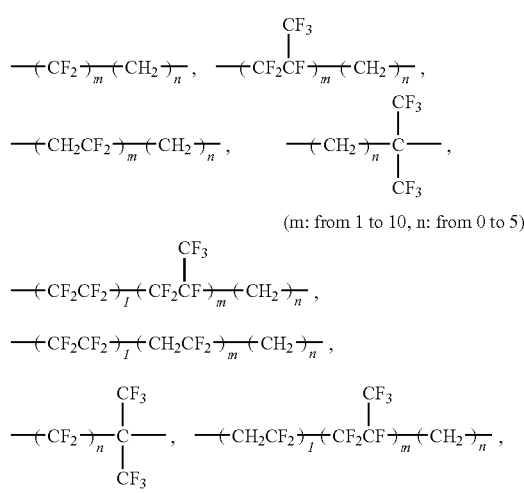

(l: from 1 to 10, m: from 1 to 10, n: from 0 to 5)

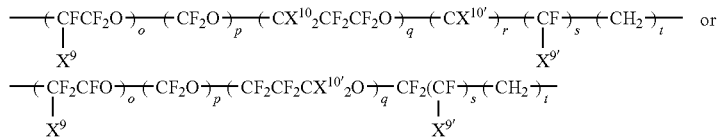

($X^9$ and $X^{9'}$ are F or $CF_3$; $X^{10}$ and $X^{10'}$ are H or F; o+p+q is from 1 to 30; r is 0 or 1; s and t are 0 or 1).

Mentioned below are structures of the structural unit M constituting the curable fluorine-containing polymer of the present invention and examples of the novel fluorine-containing unsaturated compound.

Examples of the preferable monomer giving the structural unit M2 are:

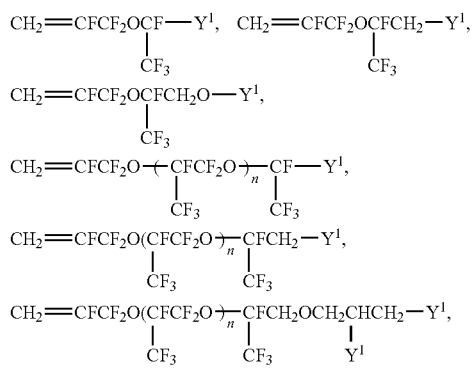

(n: an integer of from 1 to 30)
$CH_2$=$CFCF_2O$-($CF_2CF_2O$-)$_n$$CF_2$—$Y^1$,
$CH_2$=$CFCF_2O$-($CF_2CF_2O$-)$_n$$CF_2CH_2$—$Y^1$,
$CH_2$=$CFCF_2O$-($CF_2CF_2CF_2O$-)$_n$$CF_2CF_2$—$Y^1$,
$CH_2$=$CFCF_2O$-($CF_2CF_2CF_2O$-)$_n$$CF_2CF_2CH_2$—$Y^1$,
$CH_2$=$CFCF_2O$-($CH_2CF_2CF_2O$-)$_n$$CH_2CF_2$—$Y^1$,
$CH_2$=$CFCF_2O$-($CH_2CF_2CF_2O$-)$_n$$CH_2CF_2CH_2$—$Y^1$, (n: an integer of from 1 to 30)

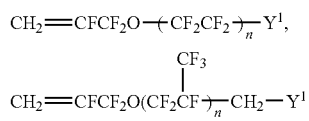

and the like. More concretely there are:

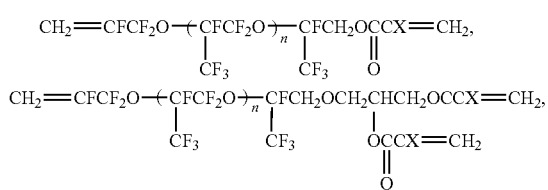

(X is H, $CH_3$, F or $CF_3$; n is 0 or an integer of from 1 to 30)

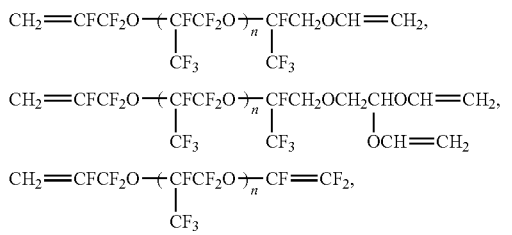

(n is 0 or an integer of from 1 to 30)

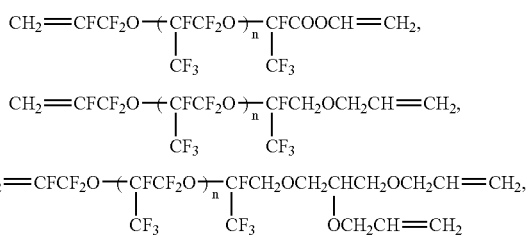

(Rf$^1$ and Rf$^2$ are perfluoroalkyl groups having 1 to 5 carbon atoms; n is 0 or an integer of from 1 to 30)

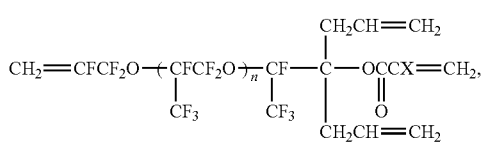

(X is H, $CH_3$, F or $CF_3$; n is 0 or an integer of from 1 to 30) and the like.

Preferable examples of the novel fluorine-containing unsaturated compound of the formula (4-3) are those exemplified above as the monomer giving the structural unit M2, in which $Y^1$ is replaced with $Y^3$.

More concretely there are:

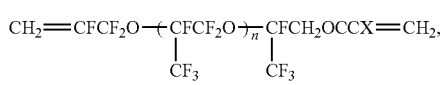

-continued
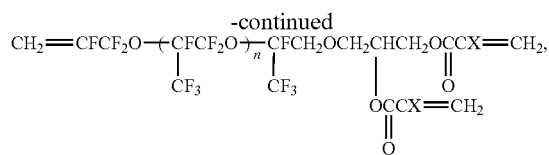

(X is H, CH$_3$, F or CF$_3$; n is 0 or an integer of from 1 to 30)

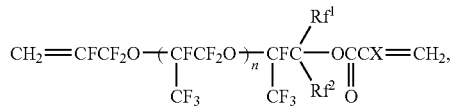

(Rf$^1$ and Rf$^2$ are perfluoroalkyl groups having 1 to 5 carbon atoms; n is 0 or an integer of from 1 to 30)

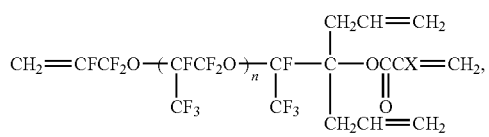

(X is H, CH$_3$, F or CF$_3$; n is 0 or an integer of from 1 to 30) and the like.

Examples of the preferable monomer giving the structural unit M3 are:

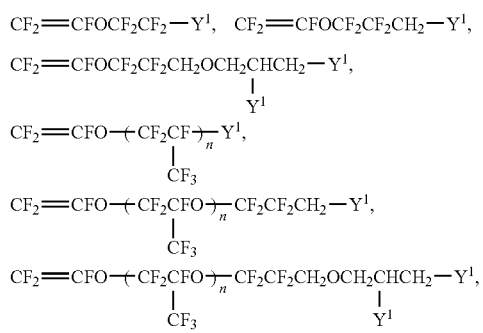

(n is from 1 to 30)

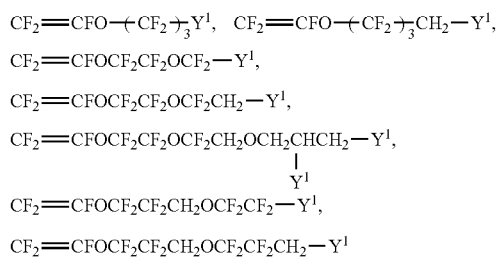

and the like.

More concretely there are:

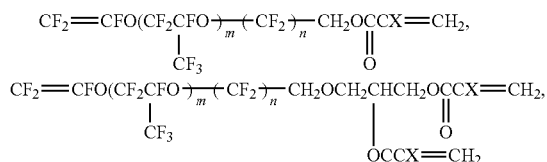

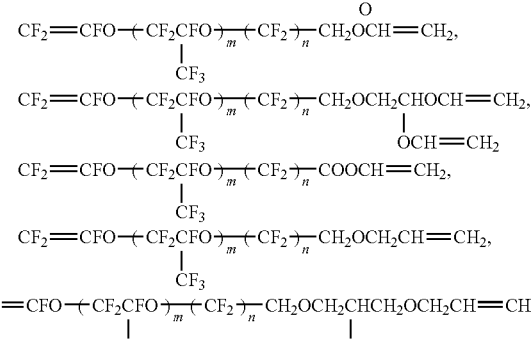

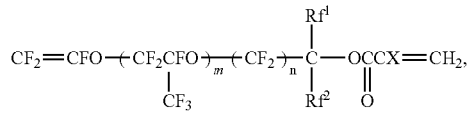

(Rf$^1$ and Rf$^2$ are perfluoroalkyl groups having 1 to 5 carbon atoms)

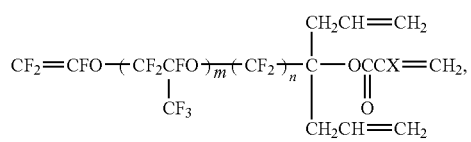

(m is from 0 to 30, n is from 1 to 3, X is H, CH$_3$, F or CF$_3$) and the like.

Preferable examples of the novel fluorine-containing unsaturated compound of the formula (4-5) are those exemplified above as the monomer giving the structural unit M3, in which Y$^1$ is replaced with Y$^3$.

More concretely there are:

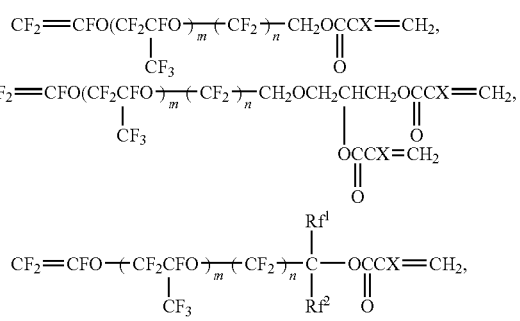

(Rf$^1$ and Rf$^2$ are perfluoroalkyl groups having 1 to 5 carbon atoms)

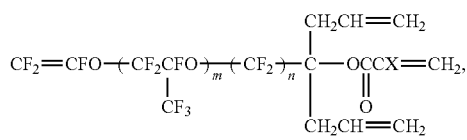

(m is from 0 to 30, n is from 1 to 3, X is H, $CH_3$, F or $CF_3$) and the like.

Examples of a preferable monomer constituting the structural unit M of the curable fluorine-containing polymer of the present invention other than M2 and M3 are, for instance,

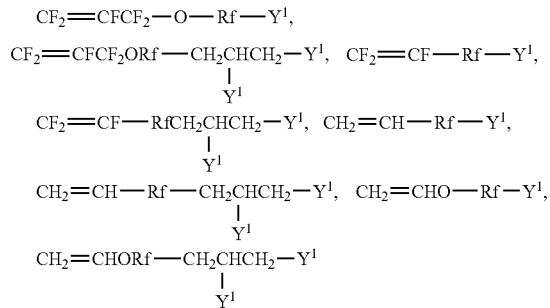

and the like, wherein Rf is as defined above.

More concretely there are:

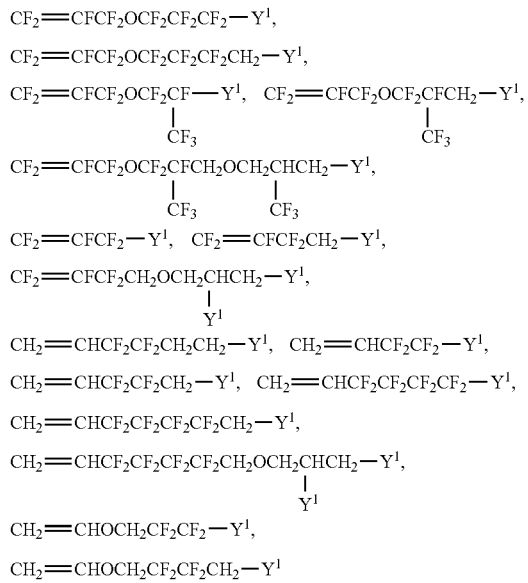

and the like.

In the novel fluorine-containing unsaturated compounds of the formula (4-1) of the present invention, preferred examples of the fluorine-containing unsaturated compounds other than those of the above-mentioned formulae (4-3) and (4-5) are the monomers exemplified above as the monomers giving the structural unit M other than the structural units M2 and M3, in which $Y^1$ is replaced by $Y^3$.

In the curable fluorine-containing polymer of the present invention, the structural unit A is an optional component and is not limited particularly as far as it is a monomer copolymerizable with the structural unit M, M1, M2 or M3. The structural unit A may be selected optionally depending on intended applications and required characteristics of the curable fluorine-containing polymer and the cured article obtained therefrom.

Examples of the structural unit A are, for instance,

① Structural Units (A1) Derived from Fluorine-Containing Ethylenic Monomers Having Functional Group These structural units are preferred from the point that adhesion to a substrate and solubility in a solvent, particularly a general-purpose solvent are imparted to the curable fluorine-containing polymer while maintaining a low refractive index of the polymer and the cured article obtained therefrom and in addition, characteristics such as crosslinkability other than those influenced by Y are imparted to the polymer. The structural unit of the fluorine-containing ethylenic monomers having functional group is represented by the formula (A1):

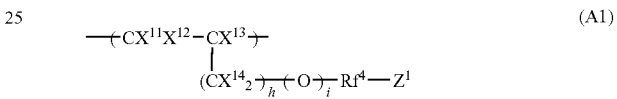

wherein $X^{11}$, $X^{12}$ and $X^{13}$ are H or F; $X^{14}$ is H, F or $CF_3$; h is 0, 1 or 2; i is 0 or 1; $Rf^4$ is a fluorine-containing alkylene group having 1 to 40 carbon atoms or a fluorine-containing alkylene group having 2 to 100 carbon atoms and ether bond; $Z^1$ is selected from —OH, —$CH_2OH$, —COOH, carboxylic acid derivative, —$SO_3H$, sulfonic acid derivative, epoxy group and cyano group. Particularly preferred is the structural unit represented by the formula (A1-1):

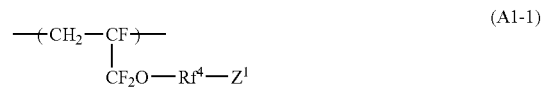

wherein $Rf^4$ and $Z^1$ are as defined in the formula (A1).

Concretely preferred are structural units derived from fluorine-containing ethylenic monomers such as:

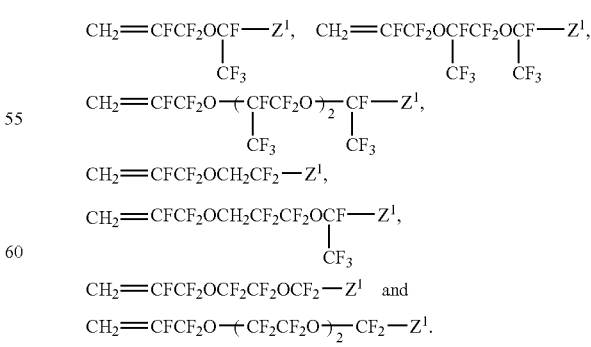

Also there are preferable structural units represented by the formula (A1-2):

(A1-2)

wherein $Rf^4$ and $Z^1$ are as defined in the formula (A1).

Concretely preferred are structural units derived from monomers such as:

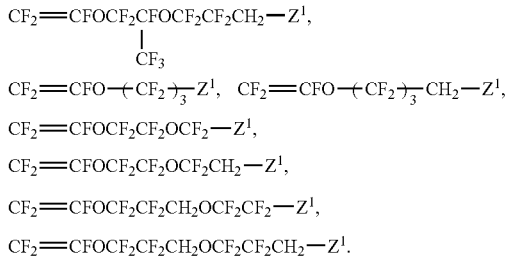

Examples of other fluorine-containing ethylenic monomers having functional group are:
$CF_2=CFCF_2-O-Rf-Z^1$, $CF_2=CF-Rf-Z_1$,
$CH_2=CH-Rf-Z^1$, $CH_2=CHO-Rf-Z^1$ and the like, wherein Rf is the same as Rf of the formula (M).

Concretely there are:

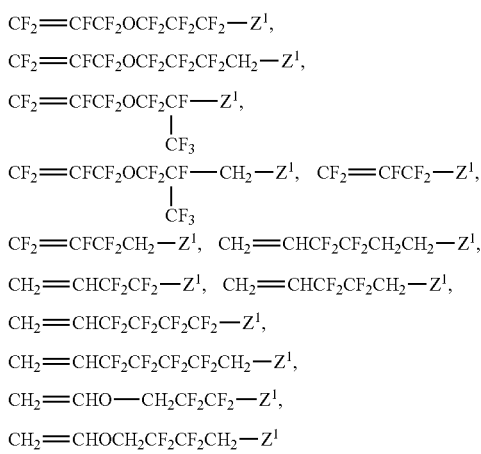

and the like.

② Structural Units (A2) Derived from Fluorine-Containing Ethylenic Monomers not Having Functional Group These structural units are preferred from the point that a refractive index of the curable fluorine-containing polymer or the cured article obtained therefrom can be kept low and the refractive index can be further reduced. Also those structural units are preferred since mechanical properties, glass transition temperature, etc. of the polymer can be adjusted by selecting monomers, particularly since the glass transition temperature can be increased by copolymerizing with the structural unit M.

Preferred structural units of the fluorine-containing ethylenic monomers are those represented by the formula (A2):

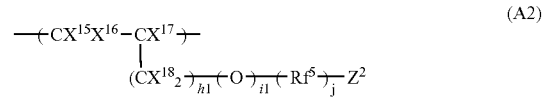

(A2)

wherein $X^{15}$, $X^{16}$ and $X^{18}$ are H or F; $X^{17}$ is H, F or $CF_3$; h1, i1 and j are 0 or 1; $Z^2$ is H, F or Cl; $Rf^5$ is a fluorine-containing alkylene group having 1 to 20 carbon atoms or a fluorine-containing alkylene group having 2 to 100 carbon atoms and ether bond.

Preferred examples thereof are structural units derived from monomers such as:

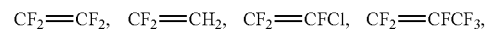

$CF_2=CF_2$, $CF_2=CH_2$, $CF_2=CFCl$, $CF_2=CFCF_3$,

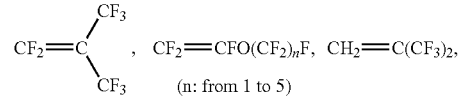

$CF_2=CFH$, $CF_2=CCl_2$, $CF_2=CFOCF_2CFO-C_3F_7$,

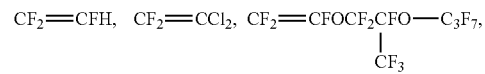

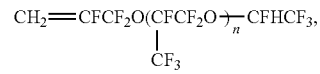

(n: from 0 to 10)

$CH_2=CF-(CF_2)_n Z^2$ ($Z^2$ is as defined in the formula (A2), n: from 1 to 10), $CH_2=CHOCH_2-(CF_2)_n Z^2$ ($Z^2$ is as defined in the formula (A2), n: from 1 to 10).

③ Fluorine-Containing Aliphatic Ring Structural Units (A3)

The introduction of these structural units is preferred since transparency can be increased, a refractive index can be made lower and further the curable fluorine-containing polymer having a high glass transition temperature can be obtained and a higher hardness of the cured article can be expected.

Preferred fluorine-containing aliphatic ring structural units are those represented by the formula (A3):

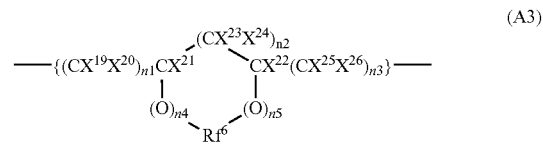

(A3)

wherein $X^{19}$, $X^{20}$, $X^{23}$, $X^{24}$, $X^{25}$ and $X^{26}$ are the same or different and each is H or F; $X^{21}$ and $X^{22}$ are the same or different and each is H, F, Cl or $CF_3$; $Rf^6$ is a fluorine-containing alkylene group having 1 to 10 carbon atoms or a fluorine-containing alkylene group having 2 to 10 carbon atoms and ether bond; n2 is 0 or an integer of from 1 to 3; n1, n3, n4 and n5 are the same or different and each is 0 or 1.

For example, there are structural units represented by:

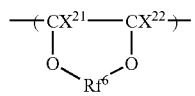

wherein $Rf^6$, $X^{21}$ and $X^{22}$ are as defined above.

Concretely there are:

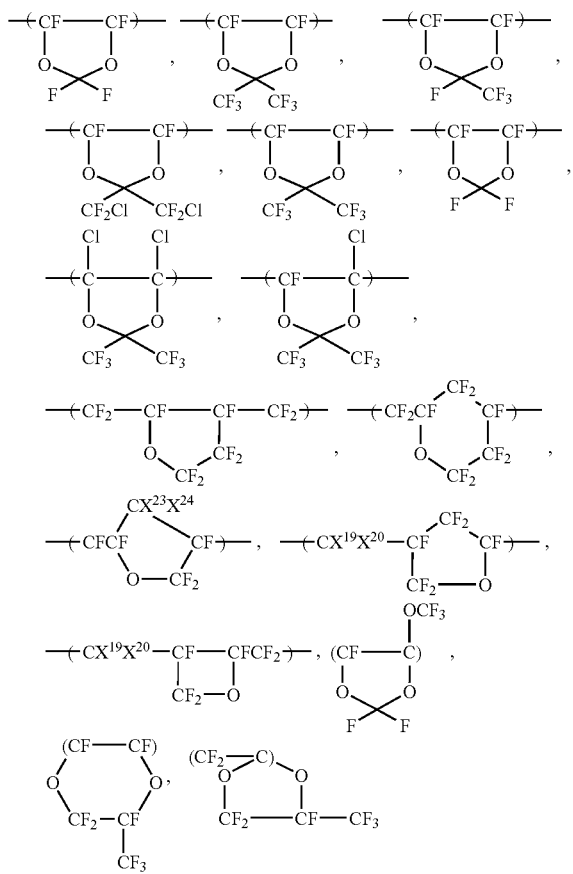

and the like.

④ Structural Units Derived from Ethylenic Monomers not Having Fluorine

The structural units derived from ethylenic monomers not having fluorine may be introduced to the polymer in a range where the introduction does not have an adverse effect on a refractive index (in a range where the refractive index does not increase).

The introduction of those structural units is preferred since solubility in a general-purpose solvent is enhanced and compatibility with additives, for example, a photocatalyst and a curing agent to be added as case demands can be improved.

Examples of the non-fluorine-containing ethylenic monomer are as follows.

α-Olefins:

Ethylene, propylene, butene, vinyl chloride, vinylidene chloride and the like.

Vinyl Ether or Vinyl Ester Monomers:

$CH_2$=CHOR, $CH_2$=CHOCOR (R: hydrocarbon group having 1 to 20 carbon atoms) and the like.

Allyl Monomers:

$CH_2$=$CHCH_2Cl$, $CH_2$=$CHCH_2OH$, $CH_2$=$CHCH_2COOH$,
$CH_2$=$CHCH_2Br$ and the like.

Allyl Ether Monomers:

$CH_2$=$CHCH_2OR$ (R: hydrocarbon group having 1 to 20 carbon atoms),

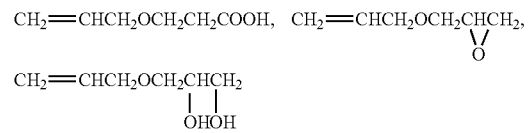

and the like.

Acrylic or Methacrylic Monomers:

Acrylic acid, methacrylic acid, acrylic acid esters, methacrylic acid esters, maleic anhydride, maleic acid, maleic acid esters and the like.

⑤ Structural Units Derived from Alicyclic Monomers

A structural unit of an alicyclic monomer may be introduced as a component copolymerizable with the structural unit M, more preferably as the third component in addition to the structural unit M and the structural unit of the above-mentioned fluorine-containing ethylenic monomer or non-fluorine-containing ethylenic monomer (the above-mentioned ③ and ④), which is preferable since a high glass transition temperature can be obtained and hardness can be increased.

Examples of the alicyclic monomer are norbornene derivatives represented by:

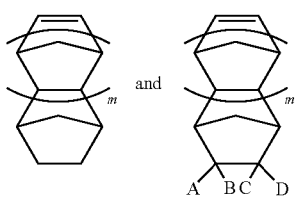

wherein m is from 0 to 3; A, B, C and D are H, F, Cl, COOH, $CH_2OH$, a perfluoroalkyl having 1 to 5 carbon atoms or the like, alicyclic monomers such as:

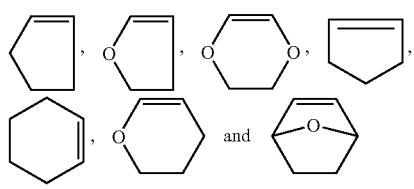

and derivatives thereof in which a substituent is introduced.

In the curable fluorine-containing polymer of the present invention, various combinations and proportions of the structural units M (M1, M2 and M3) and A can be selected from the above-mentioned examples depending on intended applications, physical properties (particularly glass transition temperature, hardness, etc.), functions (transparency and refractive index) and the like.

The curable fluorine-containing polymer of the present invention contains the structural unit M (M1, M2 or M3) as an essential component and is characterized in that the structural unit M itself has functions of maintaining a low refractive index and imparting transparency to the polymer and functions of imparting hardness, abrasion resistance, scratch resistance and solvent resistance to the cured article by curing. Therefore even if the curable fluorine-containing polymer of the present invention contains a larger amount of the structural unit M or in the extreme case, even if the polymer consists of the structural unit M (100% by mole), the low refractive index can be maintained. Further the curable fluorine-containing polymer of the present invention is preferred since the cured article having a high curing (crosslinking) density and the coating film having a high hardness and excellent abrasion resistance and scratch resistance can be obtained.

Also in the case of the copolymer of the present invention comprising the structural unit M and the structural unit A of the copolymerizable monomer, when the structural unit A is selected from the above-mentioned examples, the polymer which provides the cured article having a higher hardness (high glass transition temperature) and a low refractive index can be obtained.

In the copolymer comprising the structural unit M and the structural unit A, the proportion of the structural unit M may be not less than 0.1% by mole based on the whole monomers constituting the curable fluorine-containing polymer. It is preferable that the proportion is not less than 2.0% by mole, more preferably not less than 5% by mole, further preferably not less than 10% by mole in order to obtain the cured article having a high hardness, excellent abrasion resistance and scratch resistance and good chemical resistance and solvent resistance by curing (crosslinking).

Particularly for the antireflection film application which requires formation of a cured coating film having excellent scratch and damage resistance, it is preferable that the structural unit M is contained in an amount of not less than 10% by mole, preferably not less than 20% by mole, more preferably not less than 50% by mole.

The curable fluorine-containing polymer of the present invention is preferable particularly for the antireflection film application since a reflection reducing effect is not lowered even if the proportion of the structural unit M is increased (or even if the number of cure sites is increased).

Also in case of the antireflection film application, etc. requiring transparency, preferred combinations and proportions of the structural units M and A are those which can make the curable fluorine-containing polymer non-crystalline.

Preferred fluorine-containing polymers for a coating composition aiming at a low refractive index and a high hardness are curable fluorine-containing polymers represented by the formula (1-1).

The structural unit M in the formula (1-1) is the above-mentioned structural unit having an ethylenic carbon-carbon double bond in its side chain, and the same structural units as the above-mentioned preferable examples of the formulae (M1), (M2) and (M3) can be used as the structural unit M.

The structural unit A1 is derived from a fluorine-containing ethylenic monomer having functional group in its side chain and is represented by the formula (A1):

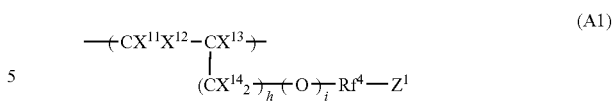

wherein $X^{11}$, $X^{12}$ and $X^{13}$ are H or F; $X^{14}$ is H, F or $CF_3$; h is 0, 1 or 2; i is 0 or 1; $Rf^4$ is a fluorine-containing alkylene group having 1 to 40 carbon atoms or a fluorine-containing alkylene group having 2 to 100 carbon atoms and ether bond; $Z^1$ is selected from —OH, —$CH_2OH$, —COOH, carboxylic acid derivative, —$SO_3H$, sulfonic acid derivative, epoxy group and cyano group. The above-mentioned examples of the structural unit A1 derived from the fluorine-containing ethylenic monomer having functional group can be preferably used similarly.

The structural unit A2 is derived from a fluorine-containing ethylenic monomer not having functional group and is represented by the formula (A2):

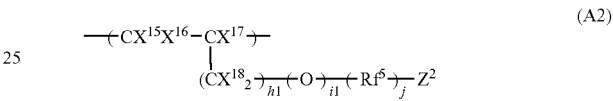

wherein $X^{15}$, $X^{16}$ and $X^{18}$ are H or F; $X^{17}$ is H, F or $CF_3$; h1, i1 and j are 0 or 1; $Z^2$ is H, F or Cl; $Rf^5$ is a fluorine-containing alkylene group having 1 to 20 carbon atoms or a fluorine-containing alkylene group having 2 to 100 carbon atoms and ether bond. The above-mentioned examples of the structural unit A2 derived from the fluorine-containing ethylenic monomer not having functional group can be preferably used similarly. Among them, preferred is a structural unit derived from at least one monomer selected from the group consisting of tetrafluoroethylene, chlorotrifluoroethylene, vinylidene fluoride and hexafluoropropylene.

It is preferable that the proportions of the structural units M, A1 and A2 are from 0 to 90% by mole, from 0 to 99.9% by mole and from 0 to 99.9% by mole, respectively and A1+A2 is from 10 to 99.9% by mole. It is particularly preferable that the proportions of the structural units M, A1 and A2 are from 10 to 80% by mole, from 1 to 60% by mole and from 20 to 85% by mole, respectively and A1+A2 is from 20 to 90% by mole. When the proportion of the structural unit M is too low, hardness of the cured coating film tends to be lowered and strength thereof tends to become insufficient. When the proportion of the structural unit A1 is too low, adhesion and coatability to a substrate and solubility in a solvent tend to become insufficient. When the proportion of the structural unit A2 is too low, there is a tendency that coatability to a substrate, leveling property and solubility in a solvent become insufficient.

In the fluorine-containing polymer comprising those structural units M, A1 and A2, hardness, mechanical strength and solvent resistance can be imparted to the cured coating film by a cure site of the structural unit M. Also the functional group of the structural unit A1 can impart adhesion to a substrate, solubility in a solvent and good coatability (wettability and leveling property) to the substrate. Further the structural unit A2 can impart, to the fluorine-containing polymer, a mechanical strength, solubility in a solvent and good coatability to a substrate.

Further since any of the structural units M, A1 and A2 have many fluorine atoms, the above-mentioned functions can be imparted while maintaining a low refractive index, and therefore the curable fluorine-containing polymer is preferred as a coating agent for an antireflection purpose.

The molecular weight of the curable fluorine-containing polymer of the present invention can be selected, for example, in a range of from 500 to 1,000,000 in number average molecular weight. Preferred molecular weight is from 1,000 to 500,000, particularly from 2,000 to 200,000.

When the molecular weight is to low, even after the curing, mechanical properties are apt to be insufficient, and particularly the cured article and cured coating film become fragile and are apt to lack strength. If the molecular weight is too high, solubility in a solvent is lowered, film forming property and leveling property tend to be lowered particularly at forming a thin coating film and storage stability of the curable fluorine-containing polymer tends to be lowered. For coating applications, most preferable number average molecular weight is selected in a range of from 5,000 to 100,000.

In the curable fluorine-containing polymer of the present invention, though various refractive indices can be selected depending on kind and content of the structural unit M and kind of the structural unit A to be used as case demands, it is preferable that the refractive index of the curable fluorine-containing polymer itself (before curing) is not more than 1.45, more preferably not more than 1.40, particularly preferably not more than 1.38. The refractive index changes depending on kinds of a substrate and undercoating, but since the curing (crosslinking) can be done while maintaining a low refractive index, the polymer can be a preferable base polymer for an antireflection film.

Also it is preferable that the curable fluorine-containing polymer is soluble in general-purpose solvents, for example, in at least one of ketone solvents, acetic acid ester solvents, alcohol solvents and aromatic solvents or in solvent mixtures containing at least one of the above-mentioned general-purpose solvents.

When the polymer is soluble in general-purpose solvents, it is preferable because film forming property and homogeneity are excellent in coating application, particularly in case of forming a thin antireflection film of about 0.1 μm thick on various transparent films and displaying substrates. The polymer is also advantageous from the viewpoint of productivity in forming an antireflection film.

In order to obtain the curable fluorine-containing polymer of the present invention, any of ① a method of previously synthesizing a monomer having the functional group $Y^1$ and then polymerizing, ② a method of once synthesizing a polymer having another functional group and then converting the functional group by high molecular reaction, thus introducing the functional group $Y^1$ into the polymer, or the like method can be employed.

In the method ①, in order to obtain the curable fluorine-containing polymer of the present invention having a carbon-carbon double bond in its side chain without reacting (curing) the carbon-carbon double bond at an end of its side chain, it is necessary to change reactivity of two kinds of double bonds (a double bond becoming a trunk chain and a double bond becoming a side chain) in a (co)polymerizable monomer and thereby make only one of the double bonds participate in the polymerization. In such a method, it is difficult to select the polymerization conditions to obtain the curable fluorine-containing polymer of the present invention having a double bond in its side chain, and also it is difficult to use a monomer which gives a high curing reactivity of the double bond in the side chain to the obtained curable polymer.

On the contrary, the method ② is a preferable method since it is easy to obtain the curable fluorine-containing polymer of the present invention without curing reaction and also from the point that a carbon-carbon double bond having a high curing reactivity can be introduced to its side chain.

Among the methods ②, there is preferably employed, for example, a method of obtaining the curable fluorine-containing polymer of the present invention by synthesizing the fluorine-containing polymer comprising the structural unit N of fluorine-containing monomer having hydroxyl or an organic group $Y^3$ having hydroxyl and as case demands, the structural unit B of monomer copolymerizable with N, and then reacting the polymer with an unsaturated carboxylic acid or its derivative to introduce a carbon-carbon double bond to an end of a side chain of the polymer.

Therefore the second of the present invention relates to the process for preparing the curable fluorine-containing polymer, which is characterized by esterification reaction, with an unsaturated carboxylic acid or its derivative, of the fluorine-containing polymer having hydroxyl and represented by the formula (2):

 (2)

in which the structural unit N is a structural unit having hydroxyl and derived from a fluorine-containing ethylenic monomer and is represented by the formula (N):

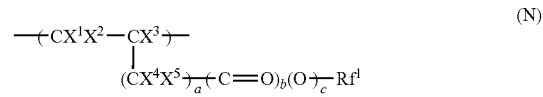 (N)

wherein $X^1$ and $X^2$ are the same or different and each is H or F; $X^3$ is H, F, $CH_3$ or $CF_3$; $X^4$ and $X^5$ are the same or different and each is H, F or $CF_3$; $Rf^1$ is an organic group in which 1 to 3 of $Y^5$ ($Y^5$ is hydroxyl or a monovalent organic group having 1 to 10 carbon atoms and hydroxyl) are bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1, the structural unit B is a structural unit derived from monomer copolymerizable with the fluorine-containing ethylenic monomer having hydroxyl and represented by the above-mentioned formula (N), and the structural unit N and the structural unit B are contained in amounts of from 0.1 to 100% by mole and from 0 to 99.9% by mole, respectively.

In the above-mentioned process for preparing the curable fluorine-containing polymer of the present invention, examples of the preferable structural unit N of the fluorine-containing polymer having hydroxyl which is a precursor represented by the formula (2) are structures which correspond to the above-exemplified respective structural units M of the curable fluorine-containing polymer and have the $Y^5$ having OH group instead of the $Y^1$ having a carbon-carbon double bond. Those structural units can be used preferably. As the structural unit B, there can be preferably used the same structural units as the above-mentioned structural unit A.

The unsaturated carboxylic acid or its derivative which is reacted with the fluorine-containing polymer having hydroxyl may be any of carboxylic acids or derivatives thereof having a carbon-carbon double bond at an end thereof. Particularly preferred are α,β-unsaturated carboxylic acids or derivatives thereof (f=0).

Examples thereof are, for instance, carboxylic acids represented by:

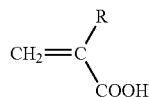

wherein R is H, CH$_3$, F, CF$_3$ or Cl, or anhydrides thereof, acid halides represented by:

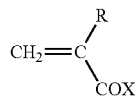

wherein R is as defined above, X is Cl or F, maleic acid, maleic anhydride, maleic acid monoalkylester and the like.

Among them, unsaturated carboxylic acid halides are preferred since the reaction can be carried out at room temperature and gelling of a prepared polymer can be prevented.

Particularly preferred are:

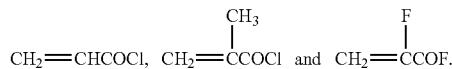

The method of reacting the fluorine-containing polymer having hydroxyl with α,β-unsaturated carboxylic acid halide is not limited particularly and is usually carried out by dissolving the fluorine-containing polymer having hydroxyl in a solvent and mixing the α,β-unsaturated carboxylic acid halide thereto at a temperature of from about −20° C. to about 40° C. with stirring.

In the reaction, through the reaction conditions, HCl and HF are produced and therefore it is desirable to add a proper base for capturing them. Examples of the base are tertiary amines such as pyridine, N,N-dimethylaniline, tetramethylurea and triethylamine, magnesium metal and the like. Also an inhibitor may be present to prevent a polymerization reaction of the carbon-carbon double bonds in the starting α,β-unsaturated carboxylic acid and the obtained curable fluorine-containing polymer during the reaction.

Examples of the inhibitor are hydroquinone, t-butyl hydroquinone, hydroquinone monomethylether and the like.

The fluorine-containing polymer having hydroxyl before the reaction with the unsaturated carboxylic acid or its derivative can be obtained by (co)polymerizing through known method the respective component units such as the ethylenic monomer (N) having hydroxyl and the monomer (B) when used as a copolymerizable component. For the polymerization, radical polymerization method, anion polymerization method, cation polymerization method and the like can be employed. Among them, the radical polymerization method is preferably used from the viewpoint that each monomer exemplified to obtain the polymer having hydroxyl of the present invention has good radial polymerizability, control of composition and molecular weight is easy and production in an industrial scale is easy.

In order to initiate the radical polymerization, means for initiation is not limited particularly as far as the polymerization proceeds radically. The polymerization is initiated, for example, with an organic or inorganic radical polymerization initiator, heat, light, ionizing radiation or the like. The polymerization can be carried out by solution polymerization, bulk polymerization, suspension polymerization, emulsion polymerization or the like. The molecular weight is controlled by the contents of the monomers to be used for the polymerization, the content of the polymerization initiator, the content of a chain transfer agent, temperature, etc. The components of the copolymer can be controlled by the starting monomer components.

The third of the present invention relates to the composition comprising a curable fluorine-containing polymer. One of the compositions of the present invention is the curable fluorine-containing resin composition comprising:

(a) a curable fluorine-containing polymer and (b) an active energy curing initiator which initiates curing with active energy.

The curable fluorine-containing polymer (a) for the composition of the present invention is the above-mentioned curable fluorine-containing polymer having a carbon-carbon double bond in its side chain, and preferred examples thereof are the same as those exemplified above.

The active energy curing initiator (b) which initiates curing with active energy functions as a catalyst which generates radical or cation only by irradiation of, for example, an electromagnetic wave having a wavelength of not more than 350 nm, namely ultraviolet light, electron beam, X-ray, γ-ray and the like and initiates curing (crosslinking reaction) of the carbon-carbon double bond of the curable fluorine-containing polymer. Usually curing initiators which generate radical or cation by irradiation of ultraviolet light, particularly those generating radical are used.

This curable fluorine-containing resin composition can initiate a curing reaction easily with the above-mentioned active energy, does not require heating at high temperatures and can be subjected to the curing reaction at low temperatures. Therefore the composition is preferred from the point that it can be used on substrates, for example, transparent resin substrates which have low heat resistance and easily undergo deformation, degrading and coloring due to heat.

In the composition of the present invention, the curing initiator (b) which initiates curing with active energy is optionally selected depending on kind of the carbon-carbon double bond (radical-reactivity or cation-reactivity) in the side chain of the curable fluorine-containing polymer (a), kind (wavelength range, etc.) of the active energy, intensity of irradiation, etc. Generally examples of the initiator which functions to initiate curing of the curable fluorine-containing polymer (a) having a radical-reactive carbon-carbon double bond with active energy in an ultraviolet region are, for instance, those mentioned below.

Acetophenone Initiators

Acetophenone, chloroacetophenone, diethoxyacetophenone, hydroxyacetophenone, α-aminoacetophenone, hydroxypropiophenone, 2-methyl-1-[4-(methylthio)phenyl]-2-morpholinepropane-1-one and the like.

Benzoin Initiators

Benzoin, benzoinmethylether, benzoinethylether, benzoinisopropylether, benzoinisobutylether, benzyldimethylketal and the like.

Benzophenone Initiators

Benzophenone, benzoyl benzoate, methyl-o-benzoylbenzoate, 4-phenylbenzophenone, hydroxybenzophenone, hydroxypropylbenzophenone, acrylated benzophenone, Michler's ketone and the like.

Thioxanthone Initiators

Thioxanthone, chlorothioxanthone, methylthioxanthone, diethylthioxanthone, dimethylthioxanthone and the like.

Other Initiators

Benzyl, α-acyloxime ester, acylphosphine oxide, glyoxyester, 3-ketocoumaran, 2-ethylanthraquinone, camphorquinone, anthraquinone and the like.

Depending on kind of the fluorine-containing polymer or kind of the above-mentioned active energy curing initiator, there is a case where compatibility between the polymer and the initiator is not good and the coating composition itself or a coating film after coating becomes turbid in white and transparency and curing reactivity are lowered (Experimental Example 21 (1)).

The present inventors have found that compatibility between the polymer and the initiator can be improved by introducing fluorine atom or an organic group having fluorine atom to the active energy curing initiator.

Concretely preferred are initiators having a fluorine-containing alkyl group, a fluorine-containing alkylene group, a fluorine-containing alkyl group having ether bond or a fluorine-containing alkylene group having ether bond. For example, there are an initiator in which a fluorine-containing carboxylic acid (polycarboxylic acid) or the like having the above-mentioned fluorine-containing organic group is introduced into an initiator having OH group by ester bonding (Experimental Example 18) and an initiator in which a fluorine-containing carboxylic acid (polycarboxylic acid) or the like is introduced into an initiator having amino group by amide bonding.

The introduction of the fluorine-containing organic group to the initiator is preferred since even in the fluorine-containing polymer having a high fluorine content, compatibility is good and curing reactivity and transparency of the coating film can be improved (Experimental Example 21(1)).

Also as case demands, an auxiliary for photo-initiation such as amines, sulfones or sulfines may be added.

Also examples of the initiator which initiates curing of the curable fluorine-containing polymer (a) having a cation-reactive carbon-carbon double bond are those mentioned below.

Onium Salts

Iodonium salt, sulfonium salt, phosphonium salt, diazonium salt, ammonium salt, pyridinium salt and the like.

Sulfone Compounds

β-ketoester, β-sulfonylsulfone, α-diazo compounds thereof and the like.

Sulfonic Acid Esters

Alkylsulfonic acid ester, haloalkylsulfonic acid ester, arylsulfonic acid ester, iminosulfonate and the like.

Others

Sulfone imide compounds, diazomethane compounds and the like.

Also in those cation-reactive active energy curing initiators, compatibility thereof with the fluorine-containing polymer can be improved by introducing fluorine atom or a fluorine-containing organic group to the initiators like the above-mentioned case.

Another embodiment of the curable fluorine-containing resin composition of the present invention is one using a solvent, which is preferable from the point that the composition dissolved and dispersed in the solvent can be coated on various substrates to form a coating film and the coating film can be effectively cured by irradiation with active energy or the like to obtain a cured coating film.

Namely, the fluorine-containing resin composition for coating of the present invention is the composition comprising:

(a) a curable fluorine-containing polymer,
(b) an active energy curing initiator and
(c) a solvent.

There can be preferably used the same curable fluorine-containing polymer (a) and active energy curing initiator (b) as in the above-mentioned curable fluorine-containing resin composition.

The solvent (c) is not limited particularly as far as the curable fluorine-containing polymer (a), active energy curing initiator (b) and additives such as a curing agent, leveling agent and light-stabilizer to be added as case demands are uniformly dissolved and dispersed therein. Particularly preferred is the solvent which uniformly dissolves the curable fluorine-containing polymer (a). This embodiment using the solvent is preferable from the point that a coating film having a high transparency and uniformity can be obtained in high productivity particularly in the antireflection film application, etc. where a thin coating film (about 0.1 μm thick) is required.

Examples of the solvent (c) are, for instance, cellosolve solvents such as methyl cellosolve, ethyl cellosolve, methyl cellosolve acetate and ethyl cellosolve acetate; ester solvents such as diethyl oxalate, ethyl pyruvate, ethyl-2-hydroxybutyrate, ethyl acetoacetate, butyl acetate, amyl acetate, ethyl butyrate, butyl butyrate, methyl lactate, ethyl lactate, methyl 3-methoxypropionate, ethyl 3-methoxypropionate, methyl 2-hydroxyisobutyrate and ethyl 2-hydroxyisobutyrate; propylene glycol solvents such as propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate and dipropylene glycol dimethyl ether; ketone solvents such as 2-hexanone, cyclohexanone, methyl amino ketone and 2-heptanone; alcohol solvents such as methanol, ethanol, propanol, isopropanol and butanol; aromatic hydrocarbons such as toluene and xylene; a solvent mixture of two or more thereof and the like.

Also in order to enhance solubility of the curable fluorine-containing polymer (a), a fluorine-containing solvent may be used as case demands.

Examples of the fluorine-containing solvent are, for instance, $CH_3CCl_2F$ (HCFC-141b), a mixture of $CF_3CF_2CHCl_2$ and $CClF_2CF_2CHClF$ (HCFC-225), perfluorohexane, perfluoro(2-butyltetrahydrofuran), methoxy-nonafluorobutane, 1,3-bistrifluoromethylbenzene, and in addition, fluorine-containing alcohols such as:

$H(CF_2CF_2)_nCH_2OH$ (n: an integer of from 1 to 3)

$F(CF_2)_nCH_2OH$ (n: an integer of from 1 to 5) and $(CF_3)_2CHOH$, benzotrifluoride, perfluorobenzene, perfluoro(tributylamine), $ClCF_2CFClCF_2CFCl_2$ and the like.

Those fluorine-containing solvents may be used solely, in a mixture of two or more thereof or in a mixture of one or more of the fluorine-containing solvents and non-fluorine-containing solvents.

Among them, ketone solvents, acetic acid ester solvents, alcohol solvents and aromatic solvents are preferred from the viewpoint of coatability and productivity of a coating film.

The present inventors have found that at dissolving the curable fluorine-containing polymer, when the fluorine-containing alcohol solvent is mixed to the above-mentioned general-purpose solvent, a leveling property of the polymer coating film after the coating on a substrate and drying can be improved.

This effect of improving a leveling property is high in the case of resin substrates, particularly an acrylic resin, cellulose resin, polyethylene terephthalate, polycarbonate and polyolefin and is exhibited significantly particularly in the case of a polyethylene terephthalate substrate (Experimental Examples 44 and 45).

The fluorine-containing alcohol to be added may be one which has a boiling point of not less than 50° C., preferably not less than 80° C. and dissolves the curable fluorine-containing polymer.

Examples thereof are, for instance,
H—$(CF_2CF_2)_n$CH$_2$OH (n is an integer of from 1 to 4),
F—$(CF_2)_n$CH$_2$OH (n is an integer of from 1 to 6),
$(CF_3)_2$CHOH and the like.

Though the fluorine-containing alcohol may be used solely as a solvent, it is effective to mix the fluorine-containing alcohol in addition to the above-mentioned general purpose solvent such as ketone solvent, acetic acid ester solvent, non-fluorine-containing alcohol solvent, aromatic solvent or the like.

When the fluorine-containing alcohol is mixed, an adding amount thereof is not less than 1% by weight, preferably not less than 5% by weight, more preferably not less than 10% by weight, particularly from 10% by weight to 30% by weight based on the whole solvents.

Further in the present invention, as case demands, a curing agent may be added to the curable fluorine-containing resin composition comprising the curable fluorine-containing polymer (a) and the active energy curing initiator (b) and also to the fluorine-containing resin composition for coating further containing the solvent (c).

Preferred curing agents are those which have at least one carbon-carbon unsaturated bond and can be polymerized with radical or an acid. Examples thereof are concretely radically polymerizable monomers such as an acrylic monomer and cationically polymerizable monomers such as a vinyl ether monomer. Those monomers may be monofunctional monomers having one carbon-carbon double bond or polyfunctional monomers having two or more carbon-carbon double bonds.

Those so-called curing agents having a carbon-carbon unsaturated bond react by radical or cation generated by reaction of the active energy curing initiator (b) in the composition of the present invention with the active energy such as light and can be crosslinked with the carbon-carbon double bond in the side chain of the curable fluorine-containing polymer (a) in the composition of the present invention by copolymerization.

Examples of the monofunctional acrylic monomer are acrylic acid, acrylic acid esters, methacrylic acid, methacrylic acid esters, α-fluoroacrylic acid, α-fluoroacrylic acid esters, maleic acid, maleic anhydride, maleic acid esters and (meth)acrylic acid esters having epoxy, hydroxyl, carboxyl or the like.

Among them, preferred are acrylate monomers having a fluoroalkyl group to maintain a low refractive index of the cured article. For example, preferred are compounds represented by the formula:

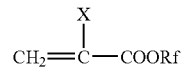

wherein X is H, CH$_3$ or F; Rf is a fluorine-containing alkyl group having 2 to 40 carbon atoms or a fluorine-containing alkyl group having 2 to 100 carbon atoms and ether bond.

Examples thereof are:

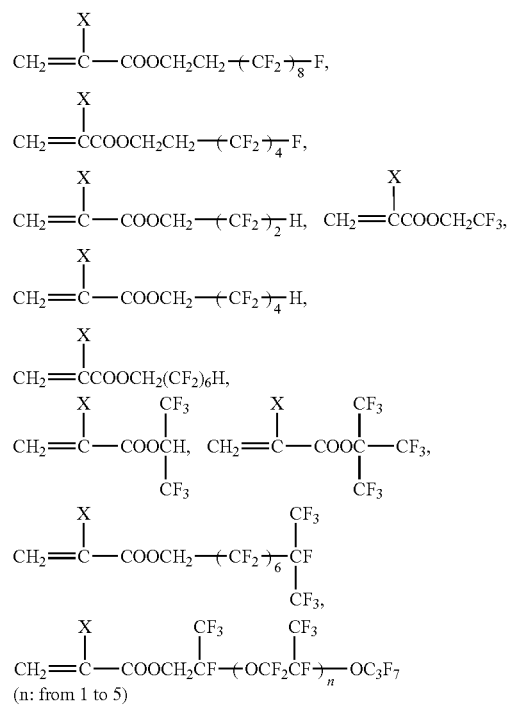

(n: from 1 to 5)

and the like.

As the polyfunctional acrylic monomer, there are generally known compounds obtained by replacing hydroxyl groups of polyhydric alcohols such as diol, triol and tetraol with acrylate groups, methacrylate groups or α-fluoroacrylate groups.

Examples thereof are compounds obtained by replacing two or more hydroxyl groups of polyhydric alcohols such as 1,3-butanediol, 1,4-butanediol, 1,6-hexanediol, diethylene glycol, tripropylene glycol, neopentyl glycol, trimethylol propane, pentaerythritol and dipentaerythritol with any of acrylate groups, methacrylate groups or α-fluoroacrylate groups.

Also there can be used polyfunctional acrylic monomers obtained by replacing two or more hydroxyl groups of polyhydric alcohols having a fluorine-containing alkyl group, a fluorine-containing alkyl group having ether bond, a fluorine-containing alkylene group or a fluorine-containing alkylene group having ether bond with acrylate groups, methacrylate groups or α-fluoroacrylate groups. Those monomers are preferred particularly from the point that a low refractive index of the cured article can be maintained.

Preferable examples thereof are compounds having structures obtained by replacing two or more hydroxyl groups of fluorine-containing polyhydric alcohols represented by the formulae:

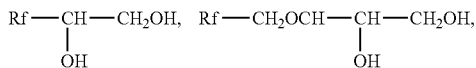

(Rf is a fluorine-containing alkyl group having 1 to 40 carbon atoms)

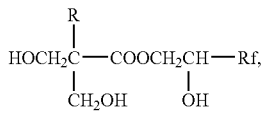

(Rf is a fluorine-containing alkyl group having 1 to 40 carbon atoms or a fluorine-containing alkyl group having 1 to 40 carbon atoms and ether bond, R is H or an alkyl group having 1 to 3 carbon atoms)

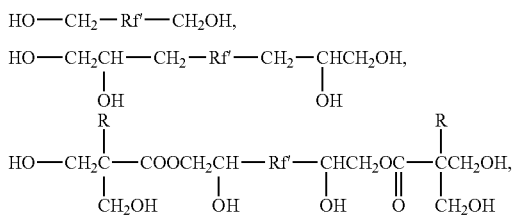

(Rf' is a fluorine-containing alkylene group having 1 to 40 carbon atoms or a fluorine-containing alkylene group having 1 to 40 carbon atoms and ether bond, R is H or an alkyl group having 1 to 3 carbon atoms)

with acrylate groups, methacrylate groups or α-fluoroacrylate groups.

When those exemplified monofunctional and polyfunctional acrylic monomers are used as the curing agent for the composition of the present invention, particularly preferred are α-fluoroacrylate compounds from the viewpoint of good curing reactivity.

In the composition of the present invention, an adding amount of the active energy curing initiator (b) is optionally selected depending on the content of the carbon-carbon double bonds in the curable fluorine-containing polymer (a), an amount of the curing agent and further kinds of the initiator and active energy and an amount of irradiation energy (intensity and time) and also depending on whether or not the above-mentioned curing agent is used. When the curing agent is not used, the amount of the initiator is from 0.01 to 30 parts by weight, preferably from 0.05 to 20 parts by weight, most preferably from 0.1 to 10 parts by weight based on 100 parts by weight of the curable fluorine-containing polymer (a).

Concretely the amount of the initiator is from 0.05 to 50% by mole, preferably from 0.1 to 20% by mole, most preferably from 0.5 to 10% by mole based on the content (the number of moles) of the carbon-carbon double bonds contained in the curable fluorine-containing polymer (a).

When the curing agent is used, the amount of the initiator is from 0.05 to 50% by mole, preferably from 0.1 to 20% by mole, most preferably from 0.5 to 10% by mole based on the total number of moles including the content (number of moles) of the carbon-carbon double bonds contained in the curable fluorine-containing polymer (a) and the number of moles of the carbon-carbon unsaturated bonds of the curing agent.

When the curing agent is used, the amount of the curing agent is optionally selected depending on intended hardness and refractive index, kind of the curing agent, the content of curable groups of the curable fluorine-containing polymer, etc. The amount is desirably from 1 to 80% by weight, preferably from 5 to 70% by weight, more preferably from 10 to 50% by weight based on the curable fluorine-containing polymer. If the amount of the curing agent is too large, there is a tendency that the refractive index is increased, which is not preferable.

The content of the solvent (c) in the fluorine-containing resin composition for coating of the present invention is optionally selected depending on kinds of solids to be dissolved, the amount of the curing agent, kind of a substrate, intended coating thickness, etc. and also depending on whether or not the curing agent is used. It is preferable to decide the amount of the solvent so that a concentration of the whole solids in the composition becomes from 0.5 to 70% by weight, preferably from 1 to 50% by weight.

To the composition of the present invention may be added various additives as case demands in addition to the above-mentioned compounds.

Examples of the additives are, for instance, a leveling agent, viscosity control agent, light-stabilizer, moisture absorbing agent, pigment, dye, reinforcing agent and the like.

Also to the composition of the present invention can be added fine particles of inorganic compounds to increase hardness of the cured article.

The fine particles of inorganic compound are not limited particularly. Preferred are compounds having a refractive index of not more than 1.5. Desirable fine particles are magnesium fluoride (refractive index: 1.38), silicon oxide (refractive index: 1.46), aluminum fluoride (refractive index: from 1.33 to 1.39), calcium fluoride (refractive index: 1.44), lithium fluoride (refractive index: from 1.36 to 1.37), sodium fluoride (refractive index: from 1.32 to 1.34), thorium fluoride (refractive index: from 1.45 to 1.50) and the like. It is desirable that a particle size of the fine particles is sufficiently small as compared with wavelengths of visible light in order to ensure transparency of the low refractive index material. The particle size is preferably not more than 100 nm, particularly preferably not more than 50 nm.

When the fine particles of inorganic compound are used, it is desirable to use them in the form of organic sol previously dispersed in an organic dispersion in order not to lower dispersion stability in the composition and adhesion in the low refractive index material. Further in order to enhance dispersion stability of the fine particles of inorganic compound in the composition and adhesion in the low refractive index material, surfaces of the fine particles of inorganic compound can be previously modified with various coupling agents. Examples of the coupling agent are, for instance, organosilicon compounds; metal alkoxides such as aluminum, titanium, zirconium, antimony and a mixture thereof; salts of organic acids; coordination compounds bonded with a coordinative compound; and the like.

In the fluorine-containing resin composition for coating of the present invention, the curable fluorine-containing polymer (a) or additives may be in either form of dispersion or solution in the solvent (c). In order to form a uniform thin coating film and enable the coating film to be formed at relatively low temperatures, the form of uniform solution is preferred.

For the coating, known coating methods can be employed as far as a coating thickness can be controlled.

For example, there can be employed a roll coating method, gravure coating method, micro-gravure coating method, flow coating method, bar coating method, spray coating method, dye coating method, spin coating method, dip coating method and the like. The coating method can be selected in consideration of kind and shape of a substrate, productivity, controllability of a coating thickness, etc.

The curable resin composition of the present invention comprising the curable fluorine-containing polymer (a) and the active energy curing initiator (b) and the coating film obtained by coating the fluorine-containing resin composition for coating of the present invention on a substrate by the above-mentioned coating method and then drying can be photo-cured by irradiation of active energy rays such as ultraviolet light, electron beam or radioactive ray.

By the photo-curing, the carbon-carbon double bonds in the curable fluorine-containing polymer (a) of the present invention are polymerized between the molecules, and the carbon-carbon double bonds in the polymer decrease or disappear. As a result, hardness of the resin becomes high, a mechanical strength is increased, abrasion resistance and scratch resistance are increased and further the composition not only becomes insoluble in a solvent in which the composition is soluble before the curing but also becomes insoluble in many other kinds of solvents.

The fourth of the present invention relates to the antireflection film.

Namely, the antireflection film is the cured coating film of the fluorine-containing prepolymer which has a coating thickness of from 0.03 to 0.5 µm and is characterized in that the prepolymer has:

(1) a carbon-carbon unsaturated bond at an end of its side chain, and (2) a refractive index of not more than 1.40.

This invention was completed based on the findings of the present inventors that when the fluorine-containing prepolymer which has a carbon-carbon unsaturated bond capable of curing (crosslinking) and is low in a refractive index is coated on a transparent substrate in a specific coating thickness and is cured, an antireflection film having a reflection reducing effect and in addition, a high hardness, abrasion resistance and scratch resistance can be obtained. When such a prepolymer is used, coatability (smoothness and uniformity of a coating thickness) is good, a low molecular weight monomer component is hard to remain in the coating film after the curing, and therefore the coating film is free from feeling of tackiness on its surface and has excellent characteristics.

The curing can be carried out with heat and light (in a system containing an initiator). However when the antireflection film is provided on a transparent resin substrate, applying high temperatures on the substrate is not preferable because thermal deterioration and thermal deformation of the substrate are apt to occur. Therefore the curing with light is preferred, and it is preferable that the fluorine-containing prepolymer has a carbon-carbon unsaturated bond capable of photo-curing (for example, photo-polymerizing).

For obtaining an antireflection film by photo-curing a fluorine-containing prepolymer, there is usually employed a method of obtaining a cured coating film by preparing a coating composition comprising:

(d) the above-mentioned fluorine-containing prepolymer,
(e) an active energy curing initiator, and
(f) a solvent, coating the coating composition on a substrate, forming a coating film (not-cured) by drying and then irradiating the coating film with active energy ray such as ultraviolet light, electron beam, radioactive ray or the like. The light irradiation may be carried out in either of air stream and inert gas stream such as nitrogen gas. Particularly the light irradiation in an inert gas stream is preferred from the viewpoint of good curing reactivity, and a coating film having a higher hardness can be obtained.

As the fluorine-containing prepolymer (d) for the antireflection film of the present invention, any of fluorine-containing prepolymers can be used as far as they have a reactive carbon-carbon unsaturated bond in the side chain thereof. From the viewpoint of good reactivity, an ethylenic carbon-carbon double bond is preferred.

Particularly preferred is a combination use of the fluorine-containing prepolymer (d1) having a radically polymerizable ethylenic carbon-carbon double bond and the initiator (e) generating radical by irradiation of active energy ray from the point that the polymerization reaction occurs rapidly, a degree of polymerization is high and the curing can be easily carried out.

Also the fluorine-containing prepolymer (d2) having an acid-polymerizable carbon-carbon double bond can be used in combination with an initiator generating an acid by irradiation of active energy ray, which is preferable from the point that the curing reaction is less affected by air (oxygen), etc. at the time of light irradiation.

The fluorine-containing prepolymer to be used for the antireflection film of the present invention is preferably the same as the above-mentioned curable fluorine-containing polymers, and among the above-mentioned examples of the curable polymer, those which have a high transparency, are non-crystalline and have a refractive index of not more than 1.40, preferably not more than 1.38 are selected. Further among them, it is preferable to optionally select the polymers depending on intended hardness, kind of a substrate, coating method, coating conditions, coating thickness, uniformity of a coating film, adhesion to the substrate, etc.

As the active energy curing initiator (e) to be used for the antireflection film of the present invention, the same initiators as exemplified in the above-mentioned curable fluorine-containing resin composition can be used. Kind and an amount of the initiator can be optionally selected in the above-mentioned range in consideration of kind (reactivity, content) of the carbon-carbon unsaturated bond in the fluorine-containing prepolymer, curing conditions, a pot life of the coating, etc.

As the solvent (f), there can be used those exemplified in the above-mentioned curable resin composition for coating. Kind and an amount of the solvent (f) are optionally selected from the above-mentioned examples depending on intended coatability, film forming property, uniformity of a coating thickness, productivity in coating, etc. Among the solvents, those which cause dissolving and swelling of the transparent substrate are not preferred.

Particularly preferred are those selected from ketone solvents, acetic acid ester solvents, alcohol solvents and aromatic hydrocarbon solvents.

In the antireflection film of the present invention, it is natural that the same curing agent (g) as mentioned above may be used together with the curable fluorine-containing prepolymer (d). The use of the curing agent can make hardness of the cured coating film higher.

Kind and an amount of the curing agent (g) to be used preferably are the same as those mentioned in the above-mentioned fluorine-containing resin composition for coating.

It is preferable that after coating of the coating composition and curing of the fluorine-containing prepolymer, the cured article (coating film) has a refractive index of not more than 1.49, more preferably not more than 1.45, further preferably not more than 1.40. Most preferred is a refractive index of not more than 1.38. A lower refractive index is more advantageous from the viewpoint of a reflection reducing effect.

A preferable coating thickness of the antireflection film to be used on various substrates varies with the refractive indices of the film and substrate and is selected in the range of from 0.03 to 0.5 µm, preferably from 0.07 to 0.2 µm, more preferably from 0.08 to 0.12 µm. When the coating thickness is too small, there is a tendency that reduction of reflectance due to light interference in visible light becomes insufficient. When the coating thickness is too large, since the reflectance comes to depend only on a reflection nearly at an interface between air and film, there is a tendency that reduction of reflectance due to light interference in visible light becomes insufficient. It is particularly preferable that a proper coating thickness is set so that a wavelength exhibiting a minimum reflectance of an antireflection-treated article provided with the antireflection film is usually from 420 to 720 nm, preferably from 520 to 620 nm.

The fifth of the present invention relates to the antireflection-treated article obtained by applying the antireflection film on a substrate.

Kind of the article, namely kind of the substrate which is provided with the antireflection film is not limited particularly. Examples thereof are, for instance, inorganic materials such as glass, stone, concrete and tile; synthetic resins, namely vinyl chloride resin, polyethylene terephthalate, cellulose resins such as triacetyl cellulose, polycarbonate resin, polyolefin resin, acrylic resin, phenol resin, xylene resin, urea resin, melamine resin, diallyl phthalate resin, furan resin, amino resin, alkyd resin, urethane resin, vinyl ester resin and polyimide resin; metals such as iron, aluminum and copper; wood, paper, printed matter, printing paper, picture, etc. When a certain portion of the article other than a specific portion thereof is provided with the antireflection film and the shape of the specific portion is lifted up by a reflecting light, a decorative effect of the article can be enhanced.

The antireflection film can be preferably provided particularly on the transparent resin substrates such as an acrylic resin, polycarbonate, cellulose rein, polyethylene terephthalate and polyolefin resin, and a reflection reducing effect can be exhibited effectively.

The present invention is effectively applied on the following articles.

Optical parts such as prism, lens sheet, polarizing plate, optical filter, lenticular lens, Fresnel lens, screen of rear projection display, optical fiber and optical coupler;

Transparent protection plates represented by glass for show window, glass for display case, cover for advertisement and cover for photo-stand; Protection plates for CRT, liquid crystal display, plasma display and rear projection display;

Optical recording media such as magnetic optical disk, read only type optical disks such as CD, LD and DVD, phase transition type optical disk such as PD and hologram recorder;

Photolithography-related members for production of semiconductors such as photoresist, photomask, pellicle and reticule;

Protection covers for light emitters such as halogen lamp, fluorescent lamp and incandescent lamp; and Sheet or film for adhering to the above-mentioned articles.

The antireflection film of the present invention may be formed into a cured coating film having a thickness of about 0.1 µm by applying a solution of the fluorine-containing prepolymer (d) directly on a substrate and then irradiating the coating film with light, or the antireflection film may be formed, as a top coat, on one or plural undercoat layers formed on the substrate.

The effects of the undercoat are roughly classified into three, namely an increase of scratch resistance of the top coat, protection of the substrate and an increase of a reflection reducing effect by providing the layers having a refractive index higher than that of the substrate. In order to increase scratch resistance of the top coat, a self-repairing undercoat mentioned in JP7-168005A may be used. Also for the protection of the substrate, a coating generally called a hard coat may be used. Examples of the hard coat are cured articles from curable acrylic resin, epoxy resin and silicon alkoxide compounds, cured articles from metal alkoxide compounds and the like. A heat curing method can be applied on all of them. For the acrylic resin and epoxy resin, a photo-curing method (ultraviolet light) is preferred from the viewpoint of productivity.

With respect to CRT and plasma display, static electricity easily deposits on the surface thereof due to characteristics of equipment. Therefore it is preferable to mix, to the undercoat layer and/or top coat layer as mentioned above, an additive imparting electric conductivity. Examples of the additive are polymers having ionic group such as —COO—, —NH$_2$, —NH$_3^+$, —NR$^{11}$R$^{12}$R$^{13}$, in which R$^{11}$, R$^{12}$ and R$^{13}$ are, for example, methyl, ethyl, n-propyl, n-butyl or the like, or —SO$_3$—, silicone compounds, inorganic electrolytes (for example, NaF, CaF$_2$, etc.) and the like.

Also in order to prevent adhesion of dust, it is preferable to add an anti-static agent to the undercoat layer of the antireflection film and/or top coat layer. Examples of the additive are the above-mentioned additives imparting electric conductivity and in addition, fine particles of metal oxides, fluoroalkoxysilane, surfactants (anionic, cationic, amphorytic and nonionic surfactants) and the like.

Examples of the preferable anti-static agent to be added to the undercoat layer are fine particles of metal oxides, concretely antimony-doped tin oxide (ATO) and indium-containing tin oxide (ITO) since the anti-static effect is high, is maintained for a long period of time and is hardly affected by humid and since the refractive index of the substrate can be adjusted because transparency and refractive index of the anti-static agent are high, thereby enabling the reflection reducing effect to be enhanced. From the viewpoint of transparency, ATO is preferred, and from the viewpoint of anti-static effect or electric conductivity, ITO is preferred. Even in case where no anti-static effect is required, a reflection reducing effect can be increased with those additives since the refractive index can be adjusted easily.

Also since ATO and ITO easily scatter and absorb light, in order not to prevent transmission of light, the thickness of the undercoat layer is preferably sub-micron or so. In order to decrease dependency of the reflection reducing effect on a wavelength and to increase the reflection reducing effect throughout the whole wavelength, the thickness of the undercoat layer is preferably from 0.05 to 0.3 µm though it depends on the refractive index of the cured fluorine-containing prepolymer. An optimum refractive index is preferably from 1.55 to 1.95 though it also depends on the refractive index of the fluorine-containing polymer.

In order to impart anti-static property to the cured fluorine-containing prepolymer coating film, alkoxysilane anti-static agents are preferred from the point that the refractive index is hardly increased and those agents do not have an adverse effect on the reflection reducing effect. Fluoroalkoxysilane is further preferred since its action to increase the refractive index is further smaller and in addition, an effect of improving surface characteristics can be expected.

Also as a method entirely different from the above-mentioned method of modifying a part of the film, there is a method of forming a surfactant layer in a thickness not having an adverse effect on the reflection reducing ability as mentioned in JP8-142280A. When this method is applied to the present invention, there is an effect of preventing adhesion of dust and enhancing stain-proofing property. There is the same effect also in the case of forming the hard coat layer.

The hard coat layer can be formed by the method of coating a solution of alkoxysilane or polysilazane and then heating and curing. Also a cured film obtained from an ultraviolet curable acrylic coating or a cured film obtained by melamine-crosslinking can be used.

Further the antireflection film of the present invention may be provided on an undercoat layer formed by applying a coating agent containing fine particles as a flattening agent, namely on a substrate film (for example, TAC film and the like) subjected to anti-glaring (AG) treatment. Thereby the antireflection film having a low gloss and a low reflection can be obtained. Such a film, when used for LCD and the like, is preferred since a further vivid image can be obtained.

The antireflection film of the present invention has a high fluorine content and a low surface contact angle and also possesses water repelling property, non-tackiness and stain-proofing property and therefore can be used as both of the antireflection layer and stain-proofing layer.

Further in order to impart stain-proofing property to the antireflection layer, a fluorine-containing polyether compound can be added. In that case, the adding amount of the compound need be decided in consideration of lowering of mechanical properties and white turbidity due to phase separation from the fluorine-containing polymer. When carboxyl group, blocked carboxyl group, hydroxyl group, epoxy group, alkoxysilane group, (meth)acryloyl group or α-fluoroacryloyl group is introduced to an end of the compound, the compound is easily fixed in the coating film (Experimental Examples 33, 34 and 35). Also there is the same effect when the same polyether compound as above is coated on a surface of a previously formed antireflection film (a coating film before or after curing).

For forming a thin film of the curable fluorine-containing polymer, there are a method of coating a dispersion of the curable fluorine-containing polymer, drying and then baking if necessary and a method of coating a solution (uniform solution) of the polymer and then drying. Preferred is the coating of the solution since a thin film is easily formed. In that case, as far as a coating thickness can be controlled sufficiently, known coating methods can be employed. For example, a roll coating method, micro gravure coating method, gravure coating method, flow coating method, bar coating method, spray coating method, die coating method, spin coating method and dip coating method can be employed. The optimum coating method is selected from them in consideration of a balance of productivity, controllability of a coating thickness, yield, etc. The antireflection film formed into a film or sheet may be adhered to a substrate.

In the present invention, a silane compound may be added to enhance adhesion of the antireflection film to the substrate. An amount of the silane compound added to the coating film may be several % by weight. Also treating of a substrate surface with a silane compound has an effect on improvement of adhesion. In the present invention, in any of the above cases, the silane compound hardly increases the refractive index of the cured film and therefore an influence thereof on the reflection reducing effect is very small.

The present invention is then explained by means of experimental examples, but is not limited to them.

Preparation Example 1

Synthesis of Homopolymer of Fluorine-Containing Allyl Ether Having OH Group

A 100 ml four-necked glass flask equipped with a stirrer and thermometer was charged with 20.4 g of perfluoro-(1,1,9,9-tetrahydro-2,5-bistrifluoromethyl-3,6-dioxanonenol):

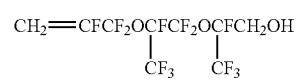

and 21.2 g of a perfluorohexane solution of 8.0% by weight of:

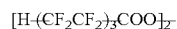

and after the inside of the flask was sufficiently replaced with nitrogen gas, stirring was carried out at 20° C. for 24 hours in nitrogen gas stream and thereby a solid having a high viscosity was produced.

The obtained solid was dissolved in diethyl ether and poured into perfluorohexane, followed by separating and vacuum drying to obtain 17.6 g of a transparent colorless polymer.

According to $^{19}$F-NMR, $^1$H-NMR and IR analyses, the polymer was a fluorine-containing polymer consisting of the structural unit of the above-mentioned fluorine-containing allyl ether and having hydroxyl at an end of its side chain. The number average molecular weight of the polymer was 9,000 according to the GPC analysis using tetrahydrofuran (THF) as a solvent and the weight average molecular weight thereof was 22,000.

Experimental Example 1

Synthesis of Curable Fluorine-Containing Polymer Having α-Fluoroacryloyl Group

A 200 ml four-necked flask equipped with a reflux condenser, thermometer, stirrer and dropping funnel was charged with 80 ml of diethyl ether, 5.0 g of the fluorine-containing allyl ether homopolymer having hydroxyl which was obtained in Preparation Example 1 and 1.0 g of pyridine, followed by cooling to 5° C. or lower with ice.

Then a solution obtained by dissolving 1.0 g of α-fluoroacrylic acid fluoride $CH_2=CFCOF$ in 20 ml of diethyl ether was added thereto dropwise over about 30 minutes while stirring in nitrogen gas stream.

After completion of the addition, the flask temperature was raised to room temperature and the stirring was further continued for 4.0 hours.

The ether solution after the reaction was put in the dropping funnel, followed by washing with water, 2% hydrochloric acid solution, 5% NaCl solution and water and then drying with anhydrous magnesium sulfate. Then the ether solution was separated by filtration.

According to $^{19}$F-NMR analysis of the ether solution, the obtained polymer was a copolymer comprising a fluorine-containing allyl ether having

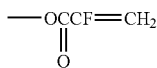

group and a fluorine-containing allyl ether having OH group in a ratio of 40:60% by mole.

The ether solution was coated on a NaCl plate and formed into a cast film at room temperature. According to IR analysis of the cast film, an absorption of a carbon-carbon double bond was observed at 1,661 cm$^{-1}$, and an absorption of C=O group was observed at 1,770 cm$^{-1}$.

Experimental Example 2

Synthesis of Curable Fluorine-Containing Polymer Having α-Fluoroacryloyl Group

A curable fluorine-containing polymer (ether solution) was synthesized in the same manner as in Experimental Example 1 except that 0.65 g of α-fluoroacrylic acid fluoride CH$_2$=CFCOF and 1.0 g of pyridine were used.

According to $^{19}$F-NMR analysis, the polymer was a copolymer comprising a fluorine-containing allyl ether having

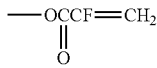

group and a fluorine-containing allyl ether having OH group in a ratio of 30:70% by mole.

According to IR analysis, an absorption of a carbon-carbon double bond and an absorption of C=O group were observed at the same positions, respectively as in Experimental Example 1.

Experimental Example 3

Synthesis of Curable Fluorine-Containing Polymer Having α-Fluoroacryloyl Group

A curable fluorine-containing polymer (ether solution) was synthesized in the same manner as in Experimental Example 1 except that 0.35 g of α-fluoroacrylic acid fluoride CH$_2$=CFCOF and 0.3 g of pyridine were used.

According to $^{19}$F-NMR analysis, the polymer was a copolymer comprising a fluorine-containing allyl ether having

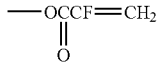

group and a fluorine-containing allyl ether having OH group in a ratio of 15:85% by mole.

According to IR analysis, an absorption of a carbon-carbon double bond and an absorption of C=O group were observed at the same positions, respectively as in Experimental Example 1.

Experimental Example 4

(1) Preparation of Fluorine-Containing Resin Composition for Coating

After methyl ethyl ketone (MEK) was added to the fluorine-containing polymer (ether solution) having α-fluoroacryloyl group which was obtained in Experimental Example 1, ether was distilled off with an evaporator to adjust a concentration of the polymer to 8.0% by weight.

To 10 g of the obtained polymer solution was added, as an active energy curing initiator, 1.7 g of a solution obtained by dissolving 2-hydroxy-2-methyl propiophenone in MEK in a concentration of 1% by weight.

(2) Production of Antireflection Film

The above-mentioned coating composition was coated on a non-treated acryl plate at room temperature at 1,000 to 2,000 rpm with a spin coater, followed by drying at 50° C. for five minutes. The number of revolutions of the spin coater was adjusted so that a coating thickness after the drying became from 90 to 110 nm.

(Light Irradiation)

The coating film after the drying was irradiated with ultraviolet light at an intensity of 3,000 mJ/cm$^2$U using a high pressure mercury lamp.

(3) Measurement of Refractive Index of Curable Fluorine-Containing Polymer

The 8% MEK solution of the curable fluorine-containing polymer (the polymer solution before adding the catalyst for curing in (1) above) was coated on a PET film with an applicator so that a coating thickness after the drying became about 100 μm. After drying at 50° C. for ten minutes, the obtained cast film was peeled from the PET film and a refractive index thereof was measured using an Abbe's refractometer at 25° C. with light having a wavelength of 550 nm. The results are shown in Table 1.

(4) Measurement of Refractive Index of Cured Film

The coating composition prepared in (1) above was coated on an aluminum foil with an applicator so that a coating thickness became about 100 μm, followed by drying at 50° C. for ten minutes. After the light irradiation was carried out in the same manner as in (2) above, the aluminum foil was melted with diluted hydrochloric acid to obtain a sample film. A refractive index of the obtained cured film was measured in the same manner as in (3) above.

(5) Measurement of Reflectance of One Side of Film

The acryl plate having the antireflection film which was obtained in (2) above was set on a UV-VIS spectrophotometer equipped with a 5° regular reflection unit, and a reflectance was measured with light having a wavelength of 550 nm.

(6) Evaluation of Physical Properties of Antireflection Film

The following physical properties of the antireflection film obtained in (2) above were evaluated.

① Set to Touch

Tackiness of the film is evaluated by touching with a finger according to JIS K4500.

The evaluation is made as follows.
○: There is no tackiness.
x: There is tackiness.

② Pencil Hardness

Measured according to JIS K5400.

③ Solvent Resistance

After the surface of the coating film is rubbed with a cotton cloth impregnated with ethyl acetate, condition (dissolved or peeled) of the surface is evaluated.

When there is no change, it is evaluated as ○, and when there is dissolving or peeling, it is evaluated as x.

Example 3 (Experimental Example 6) were used instead of the fluorine-containing polymer having α-fluoroacryloyl group which was obtained in Experimental Example 1. The results are shown in Table 1.

Experimental Example 7

An antireflection film was produced in the same manner as in Experimental Example 4 except that light irradiation was not conducted in producing the antireflection film, and evaluation of physical properties was made. The results are shown in Table 1.

Experimental Example 8

A reflectance of one side of a non-coated acryl plate was measured. The results are shown in Table 1.

TABLE 1

| | Experimental Example | | | | |
|---|---|---|---|---|---|
| | 4 | 5 | 6 | 7 | 8 |
| Substrate film | Acryl | Acryl | Acryl | Acryl | Acryl |
| Curable fluorine-containing polymer | Exp. Ex. 1 | Exp. Ex. 2 | Exp. Ex. 3 | Exp. Ex. 1 | Non-coated |
| Content of —O(C=O)CF=CH$_2$ group (% by mole) | 40 | 30 | 15 | 40 | |
| Solvent | MEK | MEK | MEK | MEK | |
| Concentration of polymer (% by weight) | 8.0 | 8.0 | 8.0 | 8.0 | |
| Active energy curing agent | 2-hydroxy-2-methyl-propiophenone | 2-hydroxy-2-methyl-propiophenone | 2-hydroxy-2-methyl-propiophenone | 2-hydroxy-2-methyl-propiophenone | |
| Proportion to polymer (% by weight) | 2.1 | 2.1 | 2.1 | 2.1 | |
| Amount of ultraviolet irradiation (mJ/cm$^2$) | 3,000 | 3,000 | 3,000 | Not irradiated | Non-coated |
| Refractive index | | | | | |
| Before curing | 1.362 | 1.359 | 1.356 | — | |
| After curing | 1.366 | 1.364 | 1.361 | — | |
| Reflectance of one side of film (%) | 1.3 | 1.2 | 1.0 | — | 4.0 |
| Set to touch | ○ | ○ | ○ | x | Non-coated |
| Pencil hardness | 2H | 2H | H | B | |
| Solvent resistance | ○ | ○ | ○ | x | |
| Abrasion resistance | ○ | ○ | ○ | x | |

The evaluation is also carried out in the same manner as above with respect to the case using acetone as a solvent.

④ Abrasion Resistance

A cotton cloth (BEMCOT (Registered trademark) M-3 available from Asahi Chemical Co., Ltd.) is fitted to a rubbing tester, and the antireflection film is rubbed by 100 rubbing cycles at a load of 100 gf/cm$^2$. Then the condition of the film is observed.

The evaluation is made as follows.
○: There is no change.
Δ: A flaw is found partly.
x: There is a portion where a film is peeled and a substrate is seen.

Experimental Examples 5 to 6

Preparation of a coating composition, production of an antireflection film and evaluation of a coating film were carried out in the same manner as in Experimental Example 4 except that the fluorine-containing polymers of Experimental Example 2 (Experimental Example 5) and Experimental Experimental Examples 9 to 12

Determination of Curing Reactivity by IR Analysis (1) Preparation of Fluorine-Containing Resin Composition for Coating Respective coating compositions were prepared using the curable fluorine-containing polymer obtained in Experimental Example 1 by the same procedures as in Experimental Example 4 so that the concentrations of the polymer and the amounts of active energy curing initiator became those shown in Table 2.

(2) Production of Film for IR Analysis

The coating compositions prepared in (1) above were coated on a PET film with an applicator so that a coating thickness after drying became about 100 μm, followed by drying at 50° C. for five minutes. Then the obtained coating films were peeled from the PET film to obtain cast films.

(3) Measurement of Curing Reactivity by IR Analysis

According to IR analysis of the cast films, an absorption of a carbon-carbon double bond in the polymer was observed at 1,661 cm$^{-1}$.

Attention was directed to this absorption of the carbon-carbon double bond, and a change in an intensity of absorption after the light irradiation was measured. A ratio of curing reaction was measured by the following equation.

$$\left(1 - \frac{\text{Peak height at 1,661 cm}^{-1} \text{ after light irradiation}}{\text{Peak height at 1,661 cm}^{-1} \text{ before light irradiation}}\right) \times 100\%$$

The films were irradiated with ultraviolet light at room temperature in irradiation amounts shown in Table 2 using a high pressure mercury lamp. The amount of irradiation was changed and the ratio of curing reaction represented by the above equation was calculated. The results are shown in Table 2.

TABLE 2

|  | Experimental Example | | | |
|---|---|---|---|---|
|  | 9 | 10 | 11 | 12 |
| Curable fluorine-containing polymer | Exp. Ex. 1 | Exp. Ex. 1 | Exp. Ex. 1 | Exp. Ex. 1 |
| Content of —O(C=O)CF=CH$_2$ group (% by mole) | 40 | 40 | 40 | 40 |
| Solvent | MEK | MEK | MEK | MEK |
| Concentration of polymer (% by weight) | 8 | 8 | 8 | 8 |
| Active energy curing initiator | 2-hydroxy-2-methyl-propiophenone | 2-hydroxy-2-methyl-propiophenone | 2-hydroxy-2-methyl-propiophenone | 2-hydroxy-2-methyl-propiophenone |
| Proportion to polymer (% by weight) | 4.2 | 2.1 | 1.0 | 0.2 |
| Ratio of curing reaction (%) Amount of ultraviolet irradiation (mJ/cm$^2$) | | | | |
| 100 | 100 | 60 | 45 | 34 |
|  | (disappeared) |  |  |  |
| 500 | — | 82 | 60 | 44 |
| 1,500 | — | 100 | 74 | 55 |
|  |  | (disappeared) |  |  |

Experimental Example 13

Synthesis of Curable Fluorine-Containing Polymer Having α-Fluoroacryloyl Group

A curable fluorine-containing polymer (ether solution) was synthesized in the same manner as in Experimental Example 1 except that 2.0 g of α-fluoroacrylic acid fluoride (CH$_2$=CFCOF) and 2.0 g of pyridine were used.

According to $^{19}$F-NMR analysis of the ether solution, the polymer was a copolymer comprising a fluorine-containing allyl ether having

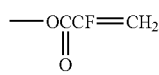

group and a fluorine-containing allyl ether having OH group in a ratio of 84:16% by mole.

According to IR analysis, an absorption of a carbon-carbon double bond and an absorption of C=O group were observed at the same positions, respectively as in Experimental Example 1.

Experimental Examples 14 to 16

Determination of Curing Reactivity by IR Analysis (1) Preparation of Fluorine-Containing Resin Composition for Coating Respective coating compositions were prepared using the curable fluorine-containing polymer obtained in Experimental Example 13 by the same procedures as in Experimental Example 4 so that the concentrations of the polymer and kinds and amounts of active energy curing initiator became those shown in Table 3.

(2) Production of Film for IR Analysis

The films were produced in the same manner as in Experimental Example 9.

(3) Measurement of Curing Reactivity by IR Analysis

A ratio of curing reaction when light irradiation was carried out in a light irradiation amount of 1,500 mJ/cm$^2$ was calculated in the same manner as in Experimental Example 9. The results are shown in Table 3.

Experimental Example 17

A fluorine-containing resin composition for coating was prepared by adding, as a curing agent,

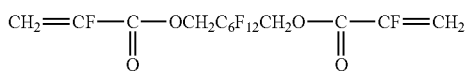

to the coating composition obtained in Experimental Example 14 so that the amount thereof became 20% by weight based on the polymer.

A film for IR analysis was produced using this resin composition in the same manner as in Experimental Example 14, and a curing reactivity was determined. The results are shown in Table 3.

perfluoro-(1,1,9,9-tetrahydro-2,5-bistrifluoromethyl-3,6-dioxanonenol), 200 g of $CH_3CCl_2F$ (HCFC-141b) and 0.16 g of methanol solution of 50% by weight of dinormalpropyl peroxy carbonate (NPP). While cooling with dry ice/methanol solution, the inside of a system was sufficiently replaced with nitrogen gas. Then 5.8 g of vinylidene fluoride (VdF) was introduced through the valve, followed by reaction while shaking at 40° C. With the advance of the reaction, 12 hours after starting of the reaction, a gauge pressure inside the system lowered from 4.4 MPaG (4.5 kgf/cm$^2$G) before the reaction to 0.98 MPaG (1.0 kgf/cm$^2$G).

TABLE 3

| | Experimental Example | | | |
|---|---|---|---|---|
| | 14 | 15 | 16 | 17 |
| Curable fluorine-containing polymer | Exp. Ex. 13 | Exp. Ex. 13 | Exp. Ex. 13 | Exp. Ex. 13 |
| Content of —O(C=O)CF=CH$_2$ group (% by mole) | 84 | 84 | 84 | 84 |
| Solvent | MEK | MEK | MEK | MEK |
| Concentration of polymer (% by weight) | 8 | 8 | 8 | 8 |
| Active energy curing initiator | 2-hydroxy-2-methyl-propiophenone | 2,2-dimethoxy-2-phenyl-acetophenone | Benzophenone | 2-hydroxy-2-methyl-propiophenone |
| Proportion to polymer (% by weight) | 2.0 | 2.0 | 2.0 | 2.0 |
| Curing agent | — | — | — | Polyfunctional acryl[1] |
| Proportion to polymer (% by weight) | — | — | — | 20 |
| Ratio of curing reaction (%) (at 1,500 mJ/cm$^2$) | 73.9 | 55.0 | 40.6 | 84.0 |

[1] Polyfunctional acryl: $CH_2$=CF(C=O)OCH$_2$—(CF$_2$)$_6$—CH$_2$O(C=O)CF=CH$_2$

Preparation Example 2

Synthesis of Homopolymer of Fluorine-Containing Allyl Ether Having OH Group Synthesis of a polymer and refining of the obtained polymer were carried out in the same manner as in Preparation Example 1 except that 20.0 g of perfluoro-(1,1,9,9-tetrahydro-2,5-bistrifluoromethyl-3,6-dioxanonenol) and 10.0 g of a perfluorohexane solution of 8.0% by weight of:

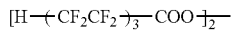

were used. Thus 18.2 g of a transparent colorless polymer was obtained.

According to $^{19}$F-NMR, $^1$H-NMR and IR analyses, the obtained polymer was a fluorine-containing polymer consisting of the structural unit of the above-mentioned fluorine-containing allyl ether and having hydroxyl at an end of its side chain. The number average molecular weight of the polymer was 30,000 according to the GPC analysis using tetrahydrofuran (THF) as a solvent and the weight average molecular weight thereof was 59,000.

Preparation Example 3

Synthesis of Copolymer Comprising Fluorine-Containing Allyl Ether Having OH Group and Vinylidene Fluoride A 300 ml stainless steel autoclave equipped with a valve, pressure gauge and thermometer was charged with 34.2 g of At that time, un-reacted monomer was released and a precipitated solid was removed and dissolved in acetone, followed by re-precipitation with a solvent mixture of hexane and toluene (50/50) to separate a copolymer. The copolymer was vacuum-dried until a constant weight was reached. Thereby 31.2 g of a copolymer was obtained.

The components of the copolymer were VdF and the fluorine-containing allyl ether having OH group in a ratio of 38:62% by mole according to $^1$H-NMR and $^{19}$F-NMR analyses. The number average molecular weight of the copolymer was 12,000 according to the GPC analysis using THF as a solvent and the weight average molecular weight thereof was 18,000.

Experimental Example 18

Synthesis of Fluorine-Containing Active Energy Curing Initiator

A 200 ml four-necked flask equipped with a reflux condenser, thermometer, stirrer and dropping funnel was charged with 2.0 g of 2-hydroxy-2-methyl propiophenone, 1.0 g of pyridine and 20 g of a mixture (HCFC-225) of $CF_3CF_2CHCl$/$CClF_2CF_2CHClF$ and was cooled to 5° C. or lower with ice.

Thereto was added dropwise 2.5 g of:

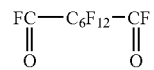

over one hour with stirring in nitrogen gas stream. After completion of the addition, the stirring was further continued for 4.0 hours.

After the reaction, the ether solution was put in the dropping funnel and washed with 2% hydrochloric acid solution and 5% NaCl solution, followed by separation of an organic layer, drying with anhydrous magnesium sulfate and distillation to isolate 2.6 g of a product (yield: 62%).

According to $^1$H-NMR, $^{19}$F-NMR and IR analyses, the product was:

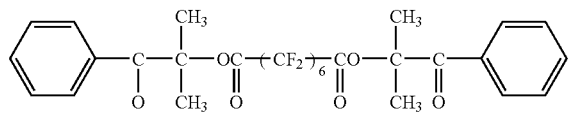

Experimental Example 19

Synthesis of Curable Fluorine-Containing Polymer Having α-Fluoroacryloyl Group

A 200 ml four-necked flask equipped with a reflux condenser, thermometer, stirrer and dropping funnel was charged with 40 ml of methyl ethyl ketone (MEK), 5.0 g of the fluorine-containing allyl ether homopolymer having hydroxyl which was obtained in Preparation Example 2 and 2.0 g of pyridine, and was cooled to 5° C. or lower with ice.

Thereto was added dropwise 1.2 g of α-fluoroacrylic acid fluoride over about 30 minutes with stirring in nitrogen gas stream. After completion of the addition, the flask temperature was raised to room temperature and the stirring was further continued for 4.0 hours.

After the reaction, the MEK solution was put in the dropping funnel and washed with water, 2% hydrochloric acid solution, 5% NaCl solution and water, followed by separation of an organic layer and drying with anhydrous magnesium sulfate. A concentration of the polymer after filtrating was 10.7% by weight.

According to $^{19}$F-NMR analysis of the MEK solution, the obtained polymer was a copolymer comprising a fluorine-containing allyl ether having

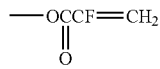

group and a fluorine-containing allyl ether having OH group in a ratio of 89:11% by mole.

According to IR analysis which was carried out in the same manner as in Experimental Example 1, an absorption of a carbon-carbon double bond and an absorption of C═O group were observed at 1,660 cm$^{-1}$ and 1,770 cm$^{-1}$, respectively.

Experimental Example 20

Synthesis of Curable Fluorine-Containing Polymer Having α-Fluoroacryloyl Group

A curable fluorine-containing polymer (MEK solution) was synthesized in the same manner as in Experimental Example 19 except that 5.0 g of the copolymer of the fluorine-containing allyl ether having OH group and VdF which was obtained in Preparation Example 3, 1.1 g of pyridine and 1.0 g of α-fluoroacrylic acid fluoride were used. A concentration of the polymer was 9.9% by weight.

According to $^{19}$F-NMR analysis, the polymer was a copolymer comprising a fluorine-containing allyl ether having

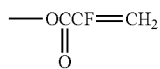

group, a fluorine-containing allyl ether having OH group and VdF in a ratio of 48:14:38% by mole.

Experimental Example 21

(1) Preparation of Fluorine-Containing Resin Composition for Coating

MEK was added to the curable fluorine-containing polymer (MEK solution) obtained in Experimental Example 19 to adjust the concentration of the polymer to 8% by weight.

To the MEK solution of the curable fluorine-containing polymer was added 2-hydroxy-2-methyl propiophenone as the active energy curing initiator so that its amount became 2.0% by weight based on the polymer. However the solution became turbid in white and the both could not be compatible with each other.

Therefore the fluorine-containing active energy curing initiator obtained in Experimental Example 18 was added instead of 2-hydroxy-2-methyl propiophenone so that its amount became 3.6% by weight based on the polymer. As a result, a transparent colorless solution was obtained and the both were compatible with each other.

(2) Evaluation of Coating Composition

The coating composition containing the fluorine-containing active energy curing initiator was evaluated in the same manner as in (2) to (6) of Experimental Example 4 (in (2), irradiation of light was carried out at 1,500 mJ/cm$^2$), and a ratio of curing reaction when irradiated with light of 1,500 mJ/cm$^2$ was measured in the same manner as in Experimental Example 10. The results are shown in Table 4.

Experimental Example 22

(1) Preparation of Fluorine-Containing Resin Composition for Coating

MEK was added to the curable fluorine-containing polymer (MEK solution) obtained in Experimental Example 20 to adjust the concentration of the polymer to 8% by weight.

To the MEK solution of the curable fluorine-containing polymer was added 2-hydroxy-2-methyl propiophenone as the active energy curing initiator so that its amount became 6.7% by weight based on the polymer. As a result, a transparent colorless solution was obtained and the both were compatible with each other.

(2) Evaluation of Coating Composition

The obtained coating composition was evaluated in the same manner as in Experimental Example 21. The results are shown in Table 4.

TABLE 4

| Experimental Example | 21 | 22 |
|---|---|---|
| Substrate film | Acryl | Acryl |
| Curable fluorine-containing polymer | Exp. Ex. 19 | Exp. Ex. 20 |
| Content of —O(C=O)CF=CH$_2$ group (% by mole) | 89 | 48 |
| Solvent | MEK | MEK |
| Concentration of polymer (% by weight) | 8 | 8 |
| Active energy curing agent | Fluorine-containing initiator of Exp. Ex. 18[2] | 2-hydroxy-2-methyl-propiophenone |
| Proportion to polymer (% by weight) | 3.6 | 6.7 |
| Amount of ultraviolet irradiation (mJ/cm$^2$) | 1,500 | 1,500 |
| Ratio of curing reaction (%) (at 1,500 mJ/cm$^2$) | 88.7 | 75.7 |
| Refractive index | | |
| Before curing | 1.368 | 1.369 |
| After curing | 1.375 | 1.377 |
| Reflectance of one side of film (%) | 1.40 | 1.42 |
| Set to touch | ○ | ○ |
| Pencil hardness | 2H | 2H |
| Solvent resistance | ○ | ○ |
| Abrasion resistance | ○ | ○ |

[2] 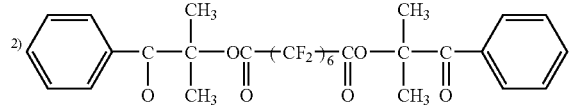

Preparation Example 4

Synthesis of Homopolymer of Fluorine-Containing Allyl Ether Having OH Group

A 100 ml four-necked glass flask equipped with a stirrer and thermometer was charged with 20.8 g of perfluoro-(1,1,9,9-tetrahydro-2,5-bistrifluoromethyl-3,6-dioxanonenol) and 2.2 g of a perfluorohexane solution of 8.0% by weight of:

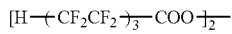

and after the inside of the flask was sufficiently replaced with nitrogen gas, stirring was carried out at 20° C. for 24 hours in nitrogen gas stream and a solid having a high viscosity was produced.

The obtained solid was dissolved in diethyl ether and poured into perfluorohexane, followed by separating and vacuum drying to obtain 19.2 g of a transparent colorless polymer.

According to $^{19}$F-NMR, $^1$H-NMR and IR analyses, the polymer was a fluorine-containing polymer consisting of the structural unit of the above-mentioned fluorine-containing allyl ether and having hydroxyl at an end of its side chain. The number average molecular weight of the polymer was 72,000 according to the GPC analysis using tetrahydrofuran (THF) as a solvent and the weight average molecular weight thereof was 118,000.

Experimental Example 23

Synthesis of Curable Fluorine-Containing Polymer Having α-Fluoroacryloyl Group

A 200 ml four-necked flask equipped with a reflux condenser, thermometer, stirrer and dropping funnel was charged with 50 ml of methyl ethyl ketone (MEK), 5.0 g of the fluorine-containing allyl ether homopolymer having hydroxyl which was obtained in Preparation Example 4 and 2.5 g of pyridine, and was cooled to 5° C. or lower with ice.

Then a solution obtained by dissolving 2.5 g of α-fluoroacrylic acid fluoride CH$_2$=CFCOF in 10 ml of MEK was added thereto dropwise over about ten minutes with stirring in nitrogen gas stream.

After completion of the addition, the flask temperature was raised to room temperature and the stirring was further continued for 2.0 hours.

After the reaction, the MEK solution was put in the dropping funnel and washed with water, 2% hydrochloric acid solution, 5% NaCl solution and water, followed by drying with anhydrous magnesium sulfate and separating the solution by filtrating to obtain the MEK solution. A concentration of the polymer was 13% by weight.

According to $^{19}$F-NMR analysis of the MEK solution, the polymer was a copolymer comprising a fluorine-containing allyl ether having —OCOCF=CH$_2$ group and a fluorine-containing allyl ether having OH group in a ratio of 70:30% by mole.

The solution was coated on a NaCl plate and formed into a cast film at room temperature. According to IR analysis of the cast film, an absorption of a carbon-carbon double bond and an absorption of C=O group were observed at 1,661 cm$^{-1}$ and 1,770 cm$^{-1}$, respectively.

Experimental Example 24

(1) Preparation of Fluorine-Containing Resin Composition for Coating

MEK was added to the solution of fluorine-containing polymer having α-fluoroacryloyl group which was obtained in Experimental Example 23 to dilute the solution and adjust a concentration of the polymer to 5.0% by weight.

To 10 g of the obtained polymer solution was added, as an active energy curing initiator, 1.2 g of a solution obtained by dissolving 2-hydroxy-2-methyl propiophenone in MEK in a concentration of 1% by weight. Thus a uniform solution was obtained.

(2) Production of Antireflection Film

The above-mentioned coating composition was coated on a non-treated acryl plate at room temperature at 1,000 to 2,000 rpm with a spin coater, followed by drying at 50° C. for five minutes. The number of revolutions of the spin coater was adjusted so that a coating thickness after the drying became from 90 to 110 nm.

(Light Irradiation)

The coating film after the drying was irradiated with ultraviolet light at room temperature at an intensity of 1,500 mJ/cm$^2$U using a high pressure mercury lamp.

(3) Measurement of Refractive Index of Curable Fluorine-Containing Polymer

The solution of fluorine-containing polymer having α-fluoroacryloyl group which was obtained in Experimental Example 23 was concentrated to 50% and coated on a PET film with an applicator so that a coating thickness after the drying became about 100 μm. After drying at 50° C. for ten minutes, the obtained cast film was peeled from the PET film and a refractive index thereof was measured using an Abbe's refractometer at 25° C. with light having a wavelength of 550 nm. The results are shown in Table 5.

(4) Measurement of Refractive Index of Cured Film

The solution of fluorine-containing polymer having α-fluoroacryloyl group which was obtained in Experimental Example 23 was concentrated to 50%, and to 2 g of the solution was added 0.01 g of 2-hydroxy-2-methyl propiophenone as the active energy curing initiator. The obtained solution was coated on an aluminum foil with an applicator so that a coating thickness after drying became about 100 μm, followed by drying at 50° C. for ten minutes. After carrying out the light irradiation in the same manner as in (2) above, the aluminum foil was melted with diluted hydrochloric acid to obtain a sample film. A refractive index of the obtained cured film was measured in the same manner as in (3) above. The results are shown in Table 5.

(5) Measurement of Reflectance of One Side of Film

The acryl plate having the antireflection film which was obtained in (2) above was set on a visible ultraviolet spectroscope equipped with a 5° regular reflection unit, and a reflectance was measured with light having a wavelength of 550 nm. The results are shown in Table 5.

(6) Evaluation of Physical Properties of Antireflection Film

The following physical properties of the surface of the antireflection film obtained in (2) above were evaluated. The results are shown in Table 5.

① Pencil Hardness
Measured according to JIS K5400.

② Solvent Resistance
After the surface of the coating film is rubbed with a cotton cloth impregnated with ethyl acetate, condition (dissolved or peeled) of the film surface is evaluated.
When there is no change, it is evaluated as ○, and when there is dissolution or peeling, it is evaluated as x.
The evaluation is also carried out in the same manner as above with respect to the case using acetone as a solvent.

③ Abrasion Resistance
A cotton cloth (BEMCOT (Registered trademark) M-3 available from Asahi Chemical Co., Ltd.) is fitted to a rubbing tester, and the antireflection film is rubbed by 100 rubbing cycles at a load of 100 gf/cm² to observe conditions of the film.
The evaluation is made as follows.
○: There is no change.
Δ: A flaw is found partly.
x: There is a portion where a film is peeled and a substrate is seen.

④ Scratch Resistance
After the surface of the coating film is rubbed with steel wool #0000, condition of the surface is evaluated.

The evaluation is made as follows.
○: There is no change.
Δ: A flaw is found at several parts.
x: There are many large flaws or the film is peeled and a substrate is seen.

Experimental Examples 25 to 27

To the coating composition obtained in (1) of Experimental Example 24 was added, as a curing agent,

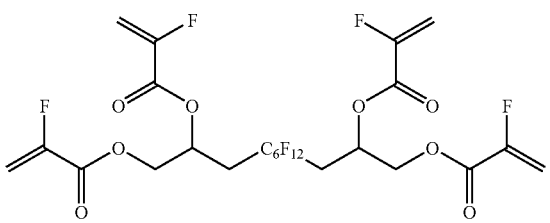

so that its amount became 10% by weight (Experimental Example 25), 30% by weight (Experimental Example 26) and 50% by weight (Experimental Example 27) based on the polymer. Antireflection films were produced in the same manner as in (2) of Experimental Example 24 using the respective coating compositions, and physical properties of the antireflection films were evaluated in the same manner as in (4) Measurement of refractive index of cured film, (5) Measurement of reflectance of one side of film and (6) Evaluation of physical properties of antireflection film. The results are shown in Table 5.

Experimental Example 28

(1) Preparation of Fluorine-Containing Resin Composition for Coating

To 0.5 g of the curing agent:

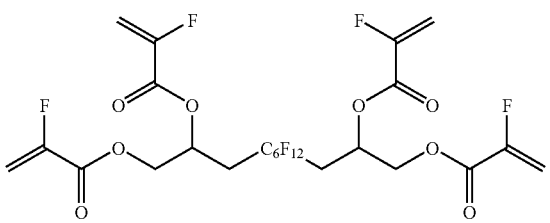

used in Experimental Example 25 was added 10 g of MEK to dissolve the curing agent, and thereto was added 1.2 g of a solution obtained by dissolving 2-hydroxy-2-methyl propiophenone as the active energy curing initiator in a concentration of 1% by weight in MEK to obtain a uniform solution. An antireflection film was produced in the same manner as in (2) of Experimental Example 24 using the obtained coating composition, and physical properties of the antireflection film were evaluated in the same manner as in (4) Measurement of refractive index of cured film, (5) Measurement of reflectance of one side of film and (6) Evaluation of physical properties of antireflection film. The results are shown in Table 5.

Experimental Example 29

A fluorine-containing resin composition for coating was prepared in the same manner as in Experimental Example 17 except that

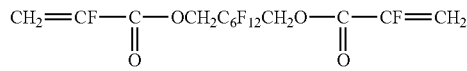

was added as a curing agent in an amount of 30% by weight based on the polymer. Thereto was added MEK to obtain 5% by weight solution in MEK. An antireflection film was produced in the same manner as in (2) of Experimental Example 24 using the obtained coating composition, and physical properties of the antireflection film were evaluated in the same manner as in (4) Measurement of refractive index of cured film, (5) Measurement of reflectance of one side of film and (6) Evaluation of physical properties of antireflection film. The results are shown in Table 5.

Experimental Example 30

Synthesis of Curable Fluorine-Containing Polymer Having α-Fluoroacryloyl Group

A 200 ml four-necked flask equipped with a reflux condenser, thermometer, stirrer and dropping funnel was charged with 50 ml of MEK, 5.0 g of the copolymer comprising a fluorine-containing allyl ether having OH group and VdF and obtained in Preparation Example 3 and 2.2 g of pyridine, and was cooled to 5° C. or lower with ice.

Then a solution obtained by dissolving 2.0 g of α-fluoroacrylic acid fluoride $CH_2=CFCOF$ in 10 ml of MEK was added thereto dropwise over about ten minutes with stirring in nitrogen gas stream.

After completion of the addition, the flask temperature was raised to room temperature and the stirring was further continued for 3.0 hours.

After the reaction, the MEK solution was put in the dropping funnel and washed with water, 2% hydrochloric acid solution, 5% NaCl solution and water, followed by drying with anhydrous magnesium sulfate and separating the MEK solution by filtrating. A concentration of the polymer was 13.0% by weight.

According to $^{19}F$-NMR analysis of the MEK solution, the polymer was a copolymer comprising a fluorine-containing allyl ether having $—OCOCF=CH_2$ group and VdF in a ratio of 62:38% by mole.

The solution was coated on a NaCl plate and formed into a cast film at room temperature. According to IR analysis of the cast film, an absorption of a carbon-carbon double bond and an absorption of $C=O$ group were observed at 1,661 $cm^{-1}$ and 1,770 $cm^{-1}$, respectively.

Experimental Example 31

(1) Preparation of coating composition, (2) Production of antireflection film and evaluation of coating film were carried out in the same manner as in Experimental Example 24 except that the fluorine-containing polymer obtained in Experimental Example 30 was used instead of the fluorine-containing polymer having α-fluoroacryloyl group and obtained in Experimental Example 23 and the fluorine-containing energy curing initiator obtained in Experimental Example 18 was used as the active energy curing initiator instead of 2-hydroxy-2-methyl propiophenone. The results are shown in Table 5.

Experimental Example 32

To the coating composition obtained in (1) of Experimental Example 31 was added, as a curing agent,

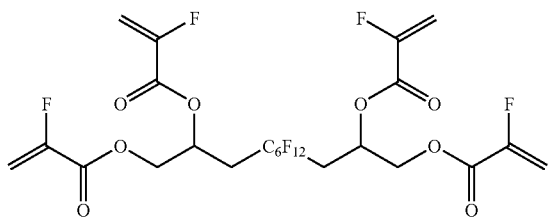

so that its amount became 10% by weight based on the polymer to obtain a composition for coating. An antireflection film was produced in the same manner as in (2) of Experimental Example 24 using the obtained coating composition, and (4) Measurement of refractive index of cured film, (5) Measurement of reflectance of one side of film and (6) Evaluation of physical properties of antireflection film were carried out in the same manner. The results are shown in Table 5.

TABLE 5

| Experimental Example | 24 | 25 | 26 | 27 |
| --- | --- | --- | --- | --- |
| Substrate film | Acryl | Acryl | Acryl | Acryl |
| Curable fluorine-containing polymer | Exp. Ex. 23 | Exp. Ex. 23 | Exp. Ex. 23 | Exp. Ex. 23 |
| Content of $—O(C=O)CF=CH_2$ group (% by mole) | 70 | 70 | 70 | 70 |
| Crosslinking agent | Tetrafunctional acryl[1] | Tetrafunctional acryl[1] | Tetrafunctional acryl[1] | Tetrafunctional acryl[1] |
| Adding amount (proportion to polymer (% by weight)) | 0 | 10 | 30 | 50 |

TABLE 5-continued

| Active energy curing agent | 2-hydroxy-2-methyl-propiophenone | 2-hydroxy-2-methyl-propiophenone | 2-hydroxy-2-methyl-propiophenone | 2-hydroxy-2-methyl-propiophenone |
|---|---|---|---|---|
| Proportion to polymer (% by weight) | 2 | 2 | 2 | 2 |
| Amount of ultraviolet irradiation (mJ/cm$^2$) | 1,500 | 1,500 | 1,500 | 1,500 |
| Refractive index | | | | |
| Before curing | 1.366 | — | — | — |
| After curing | 1.374 | 1.381 | 1.395 | 1.432 |
| Reflectance of one side of film (%) | 1.4 | 1.5 | 1.7 | 2% |
| Pencil hardness | 2H | 3H | 4H | 4H |
| Solvent resistance | ○ | ○ | ○ | ○ |
| Abrasion resistance | ○ | ○ | ○ | ○ |
| Scratch resistance | x | Δ | ○ | ○ |

| Experimental Example | 28 | 29 | 31 | 32 |
|---|---|---|---|---|
| Substrate film | Acryl | Acryl | Acryl | Acryl |
| Curable fluorine-containing polymer | | Exp. Ex. 17 | Exp. Ex. 30 | Exp. Ex. 30 |
| Content of —O(C=O)CF=CH$_2$ group (% by mole) | | 84 | 62 | 62 |
| Crosslinking agent | Only tetrafunctional acryl[1] | Bifunctional acryl[3] | Tetrafunctional acryl[1] | Tetrafunctional acryl[1] |
| Adding amount (proportion to polymer (% by weight)) | | 30 | 0 | 10 |
| Active energy curing agent | 2-hydroxy-2-methyl-propiophenone | 2-hydroxy-2-methyl-propiophenone | Fluorine-containing initiator[2] | Fluorine containing initiator[2] |
| Proportion to polymer (% by weight) | 2 | 2 | 5 | 5 |
| Amount of ultraviolet irradiation (mJ/cm$^2$) | 1,500 | 1,500 | 1,500 | 1,500 |
| Refractive index | | | | |
| Before curing | — | — | 1.370 | — |
| After curing | 1.465 | 1.390 | 1.381 | 1.384 |
| Reflectance of one side of film (%) | 3.0 | 1.6 | 1.5 | 1.5 |
| Pencil hardness | 5H | 3H | 3H | 4H |
| Solvent resistance | ○ | ○ | ○ | ○ |
| Abrasion resistance | ○ | ○ | ○ | ○ |
| Scratch resistance | ○ | Δ | Δ | ○ |

[1]Crosslinking agent (tetrafunctional)

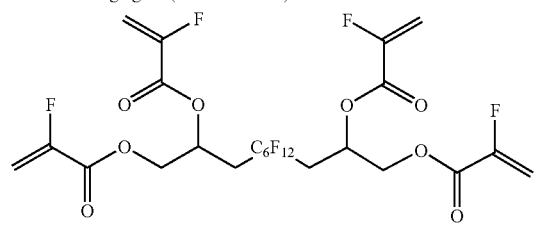

[2]Fluorine-containing energy curing initiator

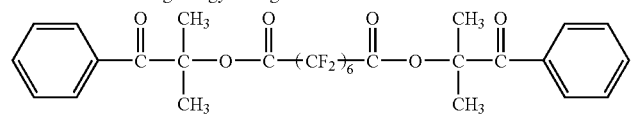

[3]Crosslinking agent (bifunctional)

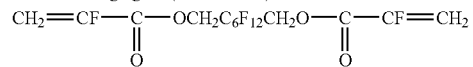

Experimental Example 33

Synthesis of Perfluoropolyether α-Fluoroacrylate

A 500 ml four-necked flask equipped with a reflux condenser, thermometer, stirrer and dropping funnel was charged with 18 g of a perfluoropolyether alcohol:

$CF_3CF_2CF_2O(CF_2CF_2CF_2O)_nCF_2CF_2CH_2OH$ (n≈20)

having a linear chain and an average molecular weight of 3,800, 1.0 g of pyridine and 125 g of 1,1,1,3,3,3-hexafluoromethaxylene, and was cooled to 5° C. or lower with ice.

Thereto was added dropwise a solution obtained by dissolving 0.84 g of α-fluoroacrylic acid fluoride $CH_2=CFCOF$ in 5 ml of 1,1,1,3,3,3-hexafluoromethaxylene over about ten minutes with stirring in nitrogen gas stream.

After completion of the addition, the flask temperature was raised to room temperature and the stirring was further continued for four hours.

After the reaction, the ether solution was put in the dropping funnel and washed with water, 2% hydrochloric acid solution, 5% NaCl solution and water, followed by drying with anhydrous magnesium sulfate and separating the solution by filtrating. After distilling off the solvent from the filtrate with an evaporator, the solution was dried for six hours in an evacuated state while heating to 70° C. and thus a transparent colorless liquid having a high viscosity was obtained.

According to $^1$H-NMR, $^{19}$F-NMR and IR analyses, the obtained product was

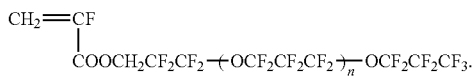

(n ≈ 20)

Experimental Examples 34 and 35

Improvement of Surface Physical Properties with Compound Having Perfluoropolyether Group (PFPE)

(1) Preparation of Fluorine-Containing Resin Composition for Coating

The MEK solutions of fluorine-containing polymer having α-fluoroacryloyl group which were obtained in Experimental Example 23 (Experimental Example 34) and Experimental Example 30 (Experimental Example 35) were concentrated to adjust a concentration thereof to 50% by weight, respectively. Then to 2 g of the concentrated MEK solution were added 3 g of a $CF_3CF_2CHCl/CClF_2CF_2CHClF$ mixture (HCFC-225), 4 g of MIBK and 6 g of $ClCF_2CClFCF_2CCl_2F$ (CFC-316). Further thereto was added 1.0 g of a solution obtained by dissolving the perfluoropolyether α-fluoroacrylate obtained in Experimental Example 33 in HCFC-225 in a concentration of 1.0% by weight.

To the obtained polymer solution was added, as an active energy curing initiator, 1 g of a solution obtained by dissolving a fluorine-containing energy curing initiator in HCFC-225 in a concentration of 10% by weight, and thus uniform solutions were obtained.

(2) Production of Antireflection Film

The coating composition obtained above was coated on a non-treated acryl plate at room temperature at 2,000 to 5,000 rpm with a spin coater, followed by drying at 50° C. for five minutes. In that case, the number of revolutions of the spin coater was adjusted so that a coating thickness after the drying became from 90 to 110 nm.

(Light Irradiation)

The coating film after the drying was irradiated with ultraviolet light at room temperature at an intensity of irradiation of 1,500 mJ/cm$^2$U using a high pressure mercury lamp.

(3) Measurement of Reflectance of One Side of Film

The acryl plate having the antireflection film which was obtained in (2) above was set on a visible ultraviolet spectroscope equipped with a 5° regular reflection unit, and a reflectance was measured with light having a wavelength of 550 nm. The results are shown in Table 6.

(4) Evaluation of Physical Properties of Antireflection Film

The following physical properties of the surface of the antireflection film obtained in (2) above were evaluated. The results are shown in Table 6.

① Pencil Hardness

Measured according to JIS K5400.

② Contact Angle

Contact angles of pure water and n-hexadecane are measured with a contact angle meter.

Experimental Examples 36 and 37

With respect to the antireflection films after the light irradiation which were obtained in (2) of Experimental Example 24 (Experimental Example 36) and (2) of Experimental Example 31 (Experimental Example 37), a contact angle was measured in the same manner as in (4) of Experimental Example 34. The results are shown in Table 6.

Preparation Example 5

Synthesis of Fluorine-Containing Allyl Ether Homopolymer Having OH Group (and Having Long Side Chain)

A 100 ml four-necked glass flask equipped with a stirrer and thermometer was charged with 10.0 g of $CH_2=CFCF_2(OCF(CF_3)CF_2)_3OCF(CF_3)CH_2OH$ and 6.2 g of a perfluorohexane solution of 8.0% by weight of:

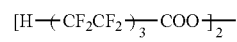

and after the inside of the flask was sufficiently replaced with nitrogen gas, stirring was carried out at 20° C. for 15 hours in nitrogen gas stream and a solid having a high viscosity was produced.

The obtained solid was dissolved in diethyl ether and poured into perfluorohexane, followed by separating and vacuum drying to obtain 7.3 g of a transparent colorless polymer.

According to $^{19}$F-NMR, $^1$H-NMR and IR analyses, the polymer was a fluorine-containing polymer consisting of the structural unit of the above-mentioned fluorine-containing allyl ether and having hydroxyl at an end of its side chain. The number average molecular weight of the polymer was 24,000 according to the GPC analysis using tetrahydrofuran (THF) as a solvent and the weight average molecular weight thereof was 79,000.

Experimental Example 38

Synthesis of Curable Fluorine-Containing Polymer Having α-Fluoroacryloyl Group (and Having Long Side Chain)

A 200 ml four-necked flask equipped with a reflux condenser, thermometer, stirrer and dropping funnel was charged with 50 ml of methyl ethyl ketone, 3.0 g of the fluorine-containing allyl ether homopolymer having hydroxyl which was obtained in Preparation Example 5 and 0.4 g of pyridine, followed by cooling to 5° C. or lower with ice.

Then a solution obtained by dissolving 0.55 g of α-fluoroacrylic acid fluoride $CH_2$=CFCOF in 10 ml of methyl ethyl ketone was added thereto dropwise over about 10 minutes while stirring in nitrogen gas stream.

After completion of the addition, the flask temperature was raised to room temperature and the stirring was further continued for 2.0 hours.

The ether solution after the reaction was put in the dropping funnel, followed by washing with water, 2% hydrochloric acid solution, 5% NaCl solution and water and then drying with anhydrous magnesium sulfate. Then the methyl ethyl ketone solution was separated by filtration.

According to $^{19}$F-NMR analysis of the methyl ethyl ketone solution, the polymer was a copolymer comprising a fluorine-containing allyl ether having —OCOCF=$CH_2$ group and a fluorine-containing allyl ether having OH group in a ratio of 54:46% by mole.

According to IR analysis, an absorption of a carbon-carbon double bond and an absorption of C=O group were observed at the same positions, respectively as in Experimental Example 23.

Experimental Example 39

An antireflection film was produced in the same manner as in (1) and (2) of Experimental Example 24 except that the fluorine-containing polymer of Experimental Example 38 was used instead of the fluorine-containing polymer having α-fluoroacryloyl group and obtained in Experimental Example 23. Physical properties of the antireflection film were evaluated in the same manner as in (3) and (4) of Experimental Example 34. The results are shown in Table 6.

Preparation Example 6

Synthesis of Copolymer Comprising Fluorine-Containing Allyl Ether Having OH Group and Fluorine-Containing Allyl Ether Having Methyl Ester Structure at an End Thereof A 100 ml four-necked glass flask equipped with a stirrer and thermometer was charged with 9.6 g of perfluoro-(1,1,9,9-tetrahydro-2,5-bistrifluoromethyl-3,6-dioxanonenol) and 9.6 g of $CH_2$=CFCF$_2$OCF(CF$_3$)CF$_2$OCF(CF$_3$)COOCH$_3$, followed by stirring sufficiently. Then thereto was added 2.0 g of a perfluorohexane solution of 8.0% by weight of:

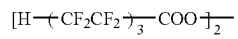

and after the inside of the flask was sufficiently replaced with nitrogen gas, stirring was carried out at 20° C. for 20 hours in nitrogen gas stream and a solid having a high viscosity was produced.

The obtained solid was dissolved in acetone and poured into a HCFC-225/n-hexane=1/1 solution, followed by separating and vacuum drying to obtain 15.5 g of a transparent colorless polymer.

According to $^{19}$F-NMR, $^1$H-NMR and IR analyses, the product was a copolymer comprising the above-mentioned fluorine-containing allyl ether having hydroxyl and fluorine-containing allyl ether having a methyl ester structure at an end thereof in a ratio of 42:58% by mole. The number average molecular weight of the polymer was 72,000 according to the GPC analysis using tetrahydrofuran (THF) as a solvent and the weight average molecular weight thereof was 117,000.

Experimental Example 40

Synthesis of Curable Fluorine-Containing Polymer Having α-Fluoroacryloyl Group

A 200 ml four-necked flask equipped with a reflux condenser, thermometer, stirrer and dropping funnel was charged with 50 ml of methyl ethyl ketone, 3.0 g of the fluorine-containing allyl ether copolymer having hydroxyl which was obtained in Preparation Example 6 and 0.6 g of pyridine. Thereto was added dropwise a solution obtained by dissolving 1.0 g of α-fluoroacrylic acid fluoride $CH_2$=CFCOF in 10 ml of MEK in the same manner as in Experimental Example 23. Thus a curable fluorine-containing polymer (MEK solution) was synthesized.

According to $^{19}$F-NMR analysis, the polymer was a copolymer comprising a fluorine-containing allyl ether having —OCOCF=$CH_2$ group, a fluorine-containing allyl ether having OH group and a fluorine-containing allyl ether having a methyl ester structure at an end thereof in a ratio of 38:4:58% by mole.

According to IR analysis, an absorption of a carbon-carbon double bond and an absorption of C=O group were observed at the same positions, respectively as in Experimental Example 23.

Experimental Example 41

An antireflection film was produced in the same manner as in (1) and (2) of Experimental Example 31 except that the fluorine-containing polymer of Experimental Example 40 was used instead of the fluorine-containing polymer having α-fluoroacryloyl group and obtained in Experimental Example 30. Then physical properties of the antireflection film were evaluated in the same manner as in (3) and (4) of Experimental Example 34. The results are shown in Table 6.

TABLE 6

| Experimental Example | 34 | 35 | 36 |
|---|---|---|---|
| Substrate film | Acryl | Acryl | Acryl |
| Content of end OH group (% by mole) | 30 | 0 | 30 |
| Adding amount of PFPE compound[1] (% by weight) | 1.0 | 1.0 | None |
| Curable fluorine-containing polymer | Exp. Ex. 23 | Exp. Ex. 30 | Exp. Ex. 23 |
| Content of —O(C=O)CF=CH$_2$ group (% by mole) | 70 | 62 | — |
| Active energy curing initiator | Fluorine-containing initiator[2] | Fluorine-containing initiator[2] | — |
| Proportion to polymer (% by weight) | 10 | 10 | — |
| Amount of ultraviolet irradiation (mJ/cm$^2$) | 1,500 mJ | 1,500 mJ | — |
| Reflectance of one side of film (%) | 1.4 | 1.5 | — |
| Pencil hardness | 2H | 3H | — |
| Contact angle | | | |
| Water | 105.5 | 98.3 | 89.5 |
| n-HD | 62.8 | 59.6 | 50.5 |
| γs | 16.1 | 18.7 | 23.8 |
| Experimental Example | 37 | 39 | 41 |
| Substrate film | Acryl | Acryl | Acryl |
| Content of end OH group (% by mole) | 0 | 46 | 4 |
| Adding amount of PFPE compound[1] (% by weight) | None | None | None |
| Curable fluorine-containing polymer | Exp. Ex. 30 | Exp. Ex. 38 | Exp. Ex. 40 |
| Content of —O(C=O)CF=CH$_2$ group (% by mole) | — | 54 | 38 |
| Active energy curing initiator | — | Fluorine-containing initiator[2] | Fluorine-containing initiator[2] |
| Proportion to polymer (% by weight) | — | 10 | 10 |
| Amount of ultraviolet irradiation (mJ/cm$^2$) | — | 1,500 mJ | 1,500 mJ |
| Reflectance of one side of film (%) | — | 1.1 | 1.4 |
| Pencil hardness | — | H | 2H |
| Contact angle | | | |
| Water | 95.5 | 105 | 93 |
| n-HD | 51.7 | 61.5 | 54.7 |
| γs | 21.3 | 16.5 | 21.6 |

[1])PFPE compound

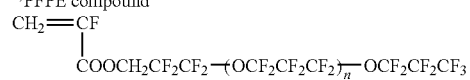

[2])Fluorine-containing energy curing initiator

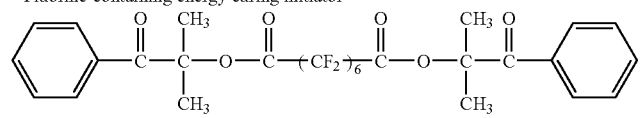

Experimental Examples 42 and 43

Preparation of Fluorine-Containing Resin Composition Possessing Improved Coatability to PET Film The MEK solutions of fluorine-containing polymer having α-fluoroacryloyl group which were obtained in Experimental Example 23 (Experimental Example 42) and Experimental Example 30 (Experimental Example 43) were concentrated to adjust a concentration thereof to 50% by weight, respectively. Then to 2 g of the concentrated MEK solution were added 14 g of MIBK and 4 g of 2,2,3,3-tetrafluoropropanol (HCF$_2$CF$_2$CH$_2$OH). Further thereto was added, as an active energy curing initiator, 1.0 g of a solution obtained by dissolving a fluorine-containing energy curing initiator in HCFC-225 in a concentration of 10% by weight, and thus uniform solutions were obtained.

Experimental Examples 44 and 45

Evaluation of Coatability to PET Film

The coating compositions obtained in Experimental Example 42 (Experimental Example 44) and Experimental Example 43 (Experimental Example 45) were coated on non-treated PET films, respectively with a doctor blade so that a coating thickness became 2 μm. The coating films were observed while air-drying at room temperature. The evaluation was carried out under the following criteria:

○: Coating film is dried in a state of uniform coating thickness and there is no interference pattern after the drying.

Δ: Coating film is dried in a state of uniform coating thickness but there is a small interference pattern after the drying.

x: After the coating, repelling of the solution occurs on the PET film and there are many interference patterns in a concentric form after the drying. The results are shown in Table 7.

Experimental Examples 46 and 47

MEK was added to the solutions of fluorine-containing polymer having α-fluoroacryloyl group which were obtained in Experimental Example 23 (Experimental Example 46) and Experimental Example 30 (Experimental Example 47) to dilute the solutions and adjust the polymer concentration to 5.0% by weight.

To 20 g of the obtained polymer solution was added, as an active energy curing initiator, 1.0 g of a solution obtained by dissolving the fluorine-containing energy curing initiator obtained in Experimental Example 18 in MEK in a concentration of 10% by weight to obtain uniform solutions. The same evaluation as in Experimental Example 44 was carried out using the obtained solutions. The results are shown in Table 7.

oxy carbonate (NPP), and the inside of a system was sufficiently replaced with nitrogen gas while cooling with a dry ice/methanol solution. Then 8.0 g of tetrafluoroethylene (TFE) was introduced through the valve. After completion of the reaction carried out for 14 hours while shaking at 40° C., un-reacted monomer was released to terminate the reaction.

A precipitated solid was removed and dissolved in acetone, followed by re-precipitation with a solvent mixture of hexane and HCFC-225 (20/80) to separate a copolymer. The copolymer was vacuum-dried until a constant weight was reached. Thus 9.3 g of the copolymer was obtained.

According to $^{19}$F-NMR and $^1$H-NMR analyses, components of the copolymer were TFE and the fluorine-containing allyl ether having OH group in a ratio of 48:52% by mole. The number average molecular weight of the polymer was 24,000 according to the GPC analysis using THF as a solvent and the weight average molecular weight thereof was 36,100.

Preparation Example 8

Synthesis of Copolymer Comprising Fluorine-Containing Allyl Ether Having OH Group and Chlorotrifluoroethylene A 100 ml stainless steel autoclave equipped with a valve, pressure gauge and thermometer was charged with 10.0 g of perfluoro(1,1,9,9-tetrahydro-2,5-bistrifluoromethyl-3,6-dioxanonenol), 50 g of $CH_3CCl_2F$ (HCFC-141b) and 0.1 g of a methanol solution of 50% by weight of dinormalpropyl per-

TABLE 7

| Experimental Example | 44 | 45 | 46 | 47 |
|---|---|---|---|---|
| Substrate film | PET | PET | PET | PET |
| Curable fluorine-containing polymer | Exp. Ex. 23 | Exp. Ex. 30 | Exp. Ex. 23 | Exp. Ex. 30 |
| Content of —O(C=O)CF=CH$_2$ group (% by mole) | 70 | 62 | 70 | 2 |
| Active energy curing initiator | Fluorine-containing initiator[1] | Fluorine-containing initiator[1] | Fluorine-containing initiator[1] | Fluorine-containing initiator[1] |
| Proportion to polymer (% by weight) | 10 | 10 | 10 | 10 |
| Components of solvent | | | | |
| MEK (% by weight) | 5 | 5 | 100 | 100 |
| MIBK (% by weight) | 74 | 74 | 0 | 0 |
| Fluorine-containing alcohol (% by weight) | 21 | 21 | 0 | 0 |
| Coatability on PET | ○ | ○ | x | Δ |

[1]Fluorine-containing energy curing initiator

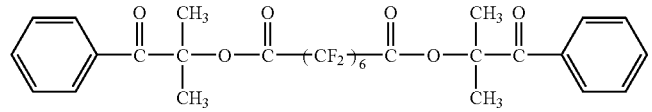

Preparation Example 7

Synthesis of Copolymer Comprising Fluorine-Containing Allyl Ether Having OH Group and Tetrafluoroethylene A 100 ml stainless steel autoclave equipped with a valve, pressure gauge and thermometer was charged with 10.0 g of perfluoro(1,1,9,9-tetrahydro-2,5-bistrifluoromethyl-3,6-dioxanonenol), 50 g of $CH_3CCl_2F$ (HCFC-14 1b) and 0.1 g of a methanol solution of 50% by weight of dinormalpropyl peroxy carbonate (NPP), and the inside of a system was sufficiently replaced with nitrogen gas while cooling with a dry ice/methanol solution. Then 5.8 g of chlorotrifluoroethylene (CTFE) was introduced through the valve. After completion of the reaction carried out for 20 hours while shaking at 40° C., un-reacted monomer was released to terminate the reaction.

A precipitated solid was removed and dissolved in acetone, followed by re-precipitation with a solvent mixture of hexane and HCFC-141b (50/50) to separate a copolymer. The copolymer was vacuum-dried until a constant weight was reached. Thus 5.7 g of the copolymer was obtained.

According to $^{19}$F-NMR and $^1$H-NMR analyses, components of the copolymer were CTFE and the fluorine-containing allyl ether having OH group in a ratio of 35:65% by mole. The number average molecular weight of the polymer was 10,500 according to the GPC analysis using THF as a solvent and the weight average molecular weight thereof was 7,200.

Experimental Example 48

Synthesis of Curable Fluorine-Containing Polymer Having α-Fluoroacryloyl Group

A 200 ml four-necked flask equipped with a reflux condenser, thermometer, stirrer and dropping funnel was charged with 50 ml of diethyl ether, 2.0 g of the fluorine-containing allyl ether copolymer having hydroxyl which was obtained in Preparation Example 7 and 0.9 g of pyridine. Thereto was added dropwise a solution obtained by dissolving 0.9 g of α-fluoroacrylic acid fluoride $CH_2$=CFCOF in 10 ml of diethyl ether in the same manner as in Experimental Example 23. Thus a curable fluorine-containing polymer (diethyl ether solution) was synthesized.

According to $^{19}$F-NMR analysis, the polymer was a copolymer comprising a fluorine-containing allyl ether having —OCOCF=$CH_2$ group and TFE in a ratio of 52:48% by mole.

According to IR analysis, an absorption of a carbon-carbon double bond and an absorption of C=O group were observed at the same positions, respectively as in Experimental Example 23.

Experimental Example 49

Synthesis of Curable Fluorine-Containing Polymer Having α-Fluoroacryloyl Group

A 200 ml four-necked flask equipped with a reflux condenser, thermometer, stirrer and dropping funnel was charged with 30 ml of methyl isobutyl ketone, 3.0 g of the fluorine-containing allyl ether copolymer having hydroxyl which was obtained in Preparation Example 8 and 0.7 g of pyridine. Thereto was added dropwise a solution obtained by dissolving 0.8 g of α-fluoroacrylic acid fluoride $CH_2$=CFCOF in 10 ml of methyl isobutyl ketone in the same manner as in Experimental Example 23. Thus a curable fluorine-containing polymer (methyl isobutyl ketone solution) was synthesized.

According to $^{19}$F-NMR analysis, the polymer was a copolymer comprising a fluorine-containing allyl ether having —OCOCF=$CH_2$ group, a fluorine-containing allyl ether having OH group and CTFE in a ratio of 50:15:35% by mole.

According to IR analysis, an absorption of a carbon-carbon double bond and an absorption of C=O group were observed at the same positions, respectively as in Experimental Example 23.

Experimental Examples 50 and 51

Refractive indices of curable fluorine-containing polymers before and after curing were measured in the same manner as in (3) and (4) of Experimental Example 24 except that the fluorine-containing polymers having α-fluoroacryloyl group which were obtained in Experimental Example 48 (Experimental Example 50) and Experimental Example 49 (Experimental Example 51) were used instead of the curable fluorine-containing polymer obtained in Experimental Example 23. The results are shown in Table 8.

TABLE 8

|  | Experimental Example | |
|---|---|---|
|  | 50 | 51 |
| Curable fluorine-containing polymer | Exp. Ex. 48 | Exp. Ex. 49 |
| Content of —O(CO)CF=$CH_2$ group | 52 | 50 |
| Refractive index |  |  |
| Before curing | 1.363 | 1.368 |
| After curing | 1.374 | 1.380 |

Experimental Example 52

Synthesis of Novel Fluorine-Containing Unsaturated Compound

A 200 ml four-necked flask equipped with a reflux condenser, thermometer, stirrer and dropping funnel was charged with 20.4 g of perfluoro(1,1,9,9-tetrahydro-2,5-bistrifluoromethyl-3,6-dioxanonenol):

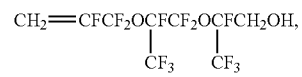

80 ml of diethyl ether and 4.3 g of pyridine, and was cooled to 5° C. or lower with ice.

Then a solution obtained by dissolving 5.1 g of α-fluoroacrylic acid fluoride $CH_2$=CFCOF in 20 ml of diethyl ether was added thereto dropwise over about 30 minutes with stirring in nitrogen gas stream.

After completion of the addition, the flask temperature was raised to room temperature and the stirring was further continued for 4.0 hours.

After the reaction, the ether solution was poured in an excessive amount of water and an organic substance was extracted with ether, followed by washing of the ether layer with water, 2% hydrochloric acid solution, 5% NaCl solution and then water, drying the ether layer with anhydrous magnesium sulfate and distilling off the ether to obtain 23 g of an organic substance.

According to $^1$H-NMR, $^{19}$F-NMR and GC-Mass analyses, the obtained product was recognized to be a novel fluorine-containing unsaturated compound represented by:

According to IR analysis, two absorptions of carbon-carbon double bond were observed at 1,661 cm$^{-1}$ and 1,695 cm$^{-1}$ and an absorption of C=O group was observed at 1,770 cm$^{-1}$.

Preparation Example 9

A 300 ml four-necked flask equipped with a reflux condenser, thermometer, stirrer and dropping funnel was charged with 46.4 g of 2,3,3,5,6,6,8-pentafluoro-4,7,10-trioxa-5,8-bistrifluoromethyl-12,13-epoxytrideca-1-ene:

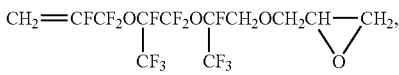

20 g of acetic acid and 1.0 g of triethylamine, followed by heating at 95° to 105° C. for four hours with stirring.

After cooling to room temperature, a solution obtained by mixing 10.0 g of 85% potassium hydroxide and 80 ml of methanol was added dropwise over about 30 minutes at room temperature through the dropping funnel. After completion of the addition, stirring was carried out at room temperature for five hours.

After completion of the reaction, 44 ml of 17% hydrochloric acid solution was added and the mixture was poured in a large amount of water. Thereafter sodium bicarbonate was added until the aqueous layer became neutral.

After neutralizing, washing with 5% $NaHCO_3$ solution and water were repeated. After drying of an ether layer with anhydrous magnesium sulfate, the ether was distilled off to obtain 29 g of an organic substance.

According to $^1$H-NMR, $^{19}$F-NMR, IR and Mass analyses, the obtained product was a fluorine-containing allyl ether compound having two hydroxyl groups and represented by the formula:

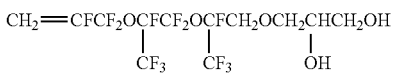

Experimental Example 53

Synthesis of Novel Fluorine-Containing Unsaturated Compound

Reaction and isolation were carried out in the same manner as in Experimental Example 52 except that 24.1 g of the fluorine-containing allyl ether compound having two hydroxyl groups which was obtained in Preparation Example 9 and represented by:

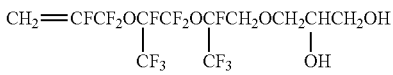

was used instead of perfluoro(1,1,9,9-tetrahydro-2,5-bistrifluoromethyl-3,6-dioxanonenol and 8.3 g of pyridine and 10.2 g of α-fluoroacrylic acid fluoride $CH_2$=CFCOF were used. Thus 19.0 g of an organic substance was obtained.

According to $^1$H-NMR, $^{19}$F-NMR and GC-Mass analyses, the obtained product was a novel fluorine-containing unsaturated compound represented by the formula:

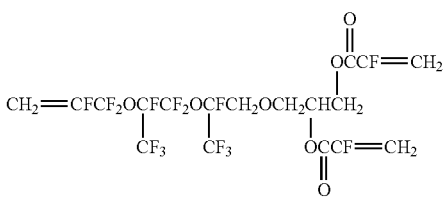

According to IR analysis, two absorptions of carbon-carbon double bond were observed at 1,661 cm$^{-1}$ and 1,695 cm$^{-1}$ and an absorption of C=O group was observed at 1,770 cm$^{-1}$.

Preparation Example 10

Synthesis of Fluorine-Containing Allyl Ether Homopolymer Having Hydroxyl

Polymerization and refining of a polymer were carried out in the same manner as in Preparation Example 1 except that 24.1 g of the fluorine-containing allyl ether compound having two hydroxyl groups which was obtained in Preparation Example 9 and represented by:

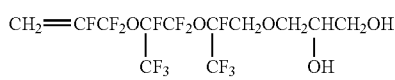

was used instead of perfluoro(1,1,9,9-tetrahydro-2,5-bistrifluoromethyl-3,6-dioxanonenol. Thus 13.5 g of a transparent colorless polymer was obtained.

According to $^1$H-NMR, $^{19}$F-NMR and IR analyses, the obtained polymer was a fluorine-containing polymer consisting of the structural unit of the above-mentioned fluorine-containing allyl ether and having two OH groups at each side chain.

Experimental Example 54

Synthesis of Curable Fluorine-Containing Polymer Having α-Fluoroacryloyl Group

Synthesis of a curable fluorine-containing polymer was carried out in the same manner as in Experimental Example 1 except that 4.8 g of the fluorine-containing allyl ether homopolymer having OH groups at each side chain and obtained in Preparation Example 10 was used instead of the fluorine-containing allyl ether polymer having hydroxyl and obtained in Preparation Example 1, and 3.1 g of pyridine and 2.0 g of α-fluoroacrylic acid fluoride were used.

According to $^{19}$F-NMR analysis of the obtained ether solution, the polymer was a polymer consisting of a structural unit derived from the fluorine-containing allyl ether represented by the formula:

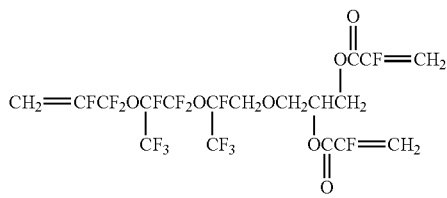

The polymer was coated on a NaCl plate and formed into a cast film at room temperature. According to IR analysis, an absorption of a carbon-carbon double bond was observed at 1,660 cm$^{-1}$ and an absorption of C=O group was observed at 1,770 cm$^{-1}$. However an absorption of OH group could not be observed.

INDUSTRIAL APPLICABILITY

According to the present invention, there can be provided a curable fluorine-containing polymer which can realize a high hardness by photo-curing while maintaining a low refractive index.

Further there can be provided an antireflection film possessing improved scratch resistance and abrasion resistance while maintaining a reflection reducing effect, and an antireflection-treated article provided with such an antireflection film can be provided.

The invention claimed is:

1. A method of production of an antireflection film, comprising a step for curing a coating composition containing a fluorine-containing prepolymer including a side chain, wherein said fluorine-containing prepolymer has:
   (i) a carbon-carbon unsaturated bond at an end of the side chain, and
   (ii) a refractive index of the fluorine-containing prepolymer of not more than 1.40,
   (iii) a thickness of the cured film is from 0.03 to 0.5 μm, and
   (iv) a number average molecular weight of from 1,000 to 1,000,000.

2. The method of claim 1, wherein the fluorine-containing prepolymer is represented by the formula (1):

(1)

in which the structural unit M is a structural unit derived from fluorine-containing ethylenic monomer and represented by the formula (M):

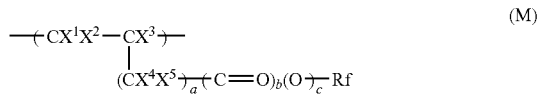

(M)

wherein $X^1$ and $X^2$ are the same or different and each is H or F; $X^3$ is H, F, $CH_3$ or $CF_3$; $X^4$ and are the same or different and each is H, F or $CF_3$; Rf is an organic group in which 1 to 3 of $Y^1$ ($Y^1$ is a monovalent organic group having 2 to 10 carbon atoms and an ethylenic carbon-carbon double bond at an end) are bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1, the structural unit A is a structural unit derived from monomer copolymerizable with the fluorine-containing ethylenic monomer represented by the formula (M), the fluorine-containing prepolymer comprises from 0.1 to 100% by mole of the structural unit M and from 0 to 99.9% by mole of the structural unit A.

3. The method of claim 2, wherein the curable fluorine-containing prepolymer is represented by the formula (1-1):

(1-1)

in which the structural unit M is the same structural unit as said formula (M), the structural unit A1 is a structural unit represented by the formula (A1):

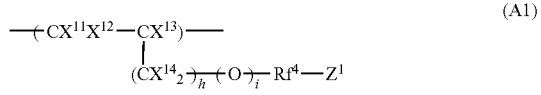

(A1)

wherein $X^{11}$, $X^{12}$ and $X^{13}$ are the same or different and each is H or F; $X^{14}$ is H, F or $CF_3$; h is 0, 1 or 2; i is 0 or 1; $Rf^4$ is a fluorine-containing alkylene group having 1 to 40 carbon atoms or a fluorine-containing alkylene group having 2 to 100 carbon atoms and ether bond; $Z^1$ is selected from —OH, —$CH_2OH$, —COOH, carboxylic acid derivative, —$SO_3H$, sulfonic acid derivative, epoxy group and cyano group, the structural unit A2 is a structural unit represented by the formula (A2):

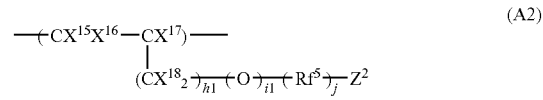

(A2)

wherein $X^{15}$, $X^{16}$ and $X^{18}$ are H or F; $X^{17}$ is H, F or h1, i1 and j are 0 or 1; $Z^2$ is H, F or Cl; $Rf^5$ is a fluorine-containing alkylene group having 1 to 20 carbon atoms or a fluorine-containing alkylene group having 2 to 100 carbon atoms and ether bond, said fluorine-containing prepolymer comprises from 0.1 to 90% by mole of the structural unit M, from 0 to 99.9% by mole of the structural unit A1 and from 0 to 99.9% by mole of the structural unit A2 and contains from 10 to 99.9% by mole of A1+A2.

4. The method of claim 2, wherein at least one $Y^1$ is bonded to an end of Rf.

5. The method of claim 2, wherein in the formula (1), the structural unit M is a structural unit M1 derived from fluorine-containing ethylenic monomer and represented by the formula (M1):

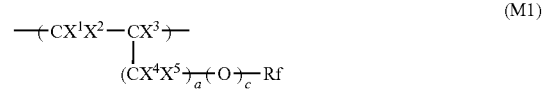

(M1)

wherein $X^1$ and $X^2$ are the same or different and each is H or F; $X^3$ is H, F, $CH_3$ or $CF_3$; $X^4$ and are the same or different and each is H, F or $CF_3$; Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond; a is 0 or an integer of from 1 to 3; c is 0 or 1.

6. The method of claim 2, wherein in the formula (1), the structural unit M is a structural unit M2 derived from fluorine-containing ethylenic monomer and represented by the formula (M2):

(M2)

wherein Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond.

7. The method of claim 2, wherein in the formula (1), the structural unit M is a structural unit M3 derived from fluorine-containing ethylenic monomer and represented by the formula (M3):

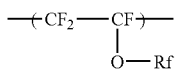 (M3)

wherein Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond.

8. The method of claim 2, wherein $Y^1$ is an organic group represented by the formula:

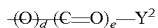

wherein $Y^2$ is an alkenyl group or fluorine-containing alkenyl group having 2 to 5 carbon atoms and an ethylenic carbon-carbon double bond at an end thereof; d and e are the same or different and each is 0 or 1.

9. The method of claim 2, wherein $Y^1$ is represented by the formula:

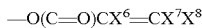

wherein $X^6$ is H, F, $CH_3$ or $CF_3$; $X^7$ and $X^8$ are the same or different and each is H or F.

10. The method of claim 3, wherein in the formula (1-1), the structural unit (A1) is represented by the formula (A1-1):

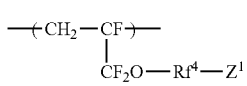 (A1-1)

wherein $Rf^4$ and $Z^1$ are as defined in the formula (A1).

11. The method of claim 3, wherein in the formula (1-1), the structural unit (A1) is represented by the formula (A1-2):

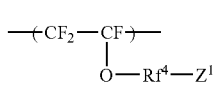 (A1-2)

wherein $Rf^4$ and $Z^1$ are as defined in the formula (A1).

12. The method of claim 3, wherein in the formula (1-1), the structural unit (A2) is a structural unit derived from at least one monomer selected from tetrafluoroethylene, vinylidene fluoride, chlorotrifluoroethylene and hexafluoropropylene.

13. The method of claim 3, wherein the fluorine-containing prepolymer of the formula (1-1) comprises from 10 to 80% by mole of the structural unit M, from 1 to 60% by mole of the structural unit A1 and from 20 to 85% by mole of the structural unit A2 and contains from 20 to 90% by mole of A1+A2.

14. The method of claim 1, wherein the coating composition comprises the fluorine-containing prepolymer, a curing initiator which initiates curing with active energy and a solvent.

15. The method of claim 14, wherein the solvent is at least one solvent selected from the group consisting of ketone solvents, acetic acid ester solvents, alcohol solvents and aromatic hydrocarbon solvents.

* * * * *